(12) United States Patent
Kitayama et al.

(10) Patent No.: US 7,603,538 B2
(45) Date of Patent: Oct. 13, 2009

(54) ACCESS ENVIRONMENT CONSTRUCTION SYSTEM AND METHOD

(75) Inventors: Takashi Kitayama, Fujisawa (JP); Yuichiro Nagashima, Yokohama (JP); Hiroyuki Shobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 11/653,880

(22) Filed: Jan. 17, 2007

(65) Prior Publication Data
US 2008/0114955 A1 May 15, 2008

(30) Foreign Application Priority Data
Nov. 10, 2006 (JP) .............................. 2006-305060

(51) Int. Cl.
*G06F 12/00* (2006.01)

(52) U.S. Cl. ..................... 711/202; 711/203; 711/111

(58) Field of Classification Search .................. 711/202, 711/203, 111
See application file for complete search history.

(56) References Cited

U.S. PATENT DOCUMENTS

| 6,988,130 | B2 * | 1/2006 | Blumenau et al. ........... 709/213 |
| 7,051,182 | B2 * | 5/2006 | Blumenau et al. ........... 711/202 |
| 7,475,131 | B2 * | 1/2009 | Achiwa et al. ............... 709/223 |
| 2006/0215552 | A1 | 9/2006 | Iwata et al. |

FOREIGN PATENT DOCUMENTS

JP 2006-268625 3/2005

\* cited by examiner

*Primary Examiner*—Hong Kim
*Assistant Examiner*—Ngoc V Dinh
(74) *Attorney, Agent, or Firm*—Stites & Harbison PLLC; Juan Carlos A. Marquez, Esq.

(57) ABSTRACT

Host environment information of the host is acquired from an environment management section that manages the host environment information, a designation of a volume condition constituting a condition related to the logical volume is received from the user, a logical volume that conforms to the designated condition among a plurality of logical volumes is sought, an internal path which is a logical path in the storage system is constructed by allocating the logical volume thus found to any of the plurality of communication ports, and the acquired host environment information is allocated to at least one of the communication ports and logical volumes in the internal path thus constructed.

16 Claims, 20 Drawing Sheets

FIG. 3

HOST INFORMATION MANAGEMENT TABLE 321

| HOST BASIC INFORMATION | | | | OS INFORMATION | | HOST GROUP | |
|---|---|---|---|---|---|---|---|
| NICKNAME | HOST ID | HOST NAME | IP ADDRESS | NAME | VR | HOST GROUP ID | HBA-WWN |
| Black | 0001 | hateruma | 10.208.115.9 | Solaris | 9 | 0009 | 20000000173000942C<br>21000003BA36109A<br>20000000173000942D<br>21000003BA36109B |
| Yellow | 0002 | aguni | 10.208.115.11 | AIX | 5.3 | 0021 | 50000870003000026<br>50000870003000027 |
| White | 0003 | | | | | | |
| Red | 0004 | kagura | 10.208.115.59 | HP-UX | 11.23 | 0032 | 50060B00000BBDF8<br>50060B00000BBDF9<br>50060B00000219B5E<br>50060B00000219B5F |
| Orange | 0005 | | | | | | |
| Green | 0006 | kumamoto | 10.208.115.77 | RHEL | AS4 | 0124 | 210000E08B11ABA4<br>200000E08B11ABA4 |
| Blue | 0007 | | | | | | |

FIG. 4

VOLUME INFORMATION MANAGEMENT TABLE 323

| LDEV NUMBER | CAPACITY (GB) | VOLUME INFORMATION ||||| STATE | HOST ID |
| | | STORAGE TYPE | STORAGE NUMBER | PORT NUMBER | LUN | | |
|---|---|---|---|---|---|---|---|
| 00:01 | 500 | AAAA500 | 036E2 | CL1-g<br>CL2-g<br>CL3-g<br>CL4-g | 01<br>02<br>01<br>02 | active | 0001 |
| 00:12 | 150 | BB700 | 895F | CL1-a<br>CL2-a | 07<br>11 | active | 0002 |
| 00:17 | 1000 | AAAA500 | 036E5 | | | reserve | 0003 |
| 00:2c | 800 | AAAA500 | 036E5 | CL3-c<br>CL4-c | E1<br>27 | active | 0004 |
| 00:5e | 300 | BB700 | 895F | | | | |
| 00:76 | 1200 | BB700 | 36E5 | CL1-e<br>CL2-e | 33<br>44 | active | 0006 |
| 00:d7 | 700 | AAAA500 | 036E2 | | | reserve | 0007 |

FIG. 5A

VOLUME BASIC INFORMATION MANAGEMENT TABLE 123

| HOST BASIC INFORMATION | | OS INFORMATION | | PATH MANAGEMENT SOFTWARE MANAGER INFORMATION | |
|---|---|---|---|---|---|
| HOSTNAME | IP ADDRESS | NAME | VR | NAME | VR |
| hateruma | 10.208.115.9 | Solaris | 9 | ABCD | 05-80 |

FIG. 5B

HBA INFORMATION MANAGEMENT TABLE 125

| HBA INFORMATION | | | |
|---|---|---|---|
| HBA ID | NAME | PORT NUMBER | WWN |
| 1 | SUN X6799 | 01 | 20000000173300942C |
| | | 02 | 20000000173300942D |
| 2 | SUN X6799 | 01 | 21000003BA36109A |
| | | 02 | 21000003BA36109B |

FIG. 7A
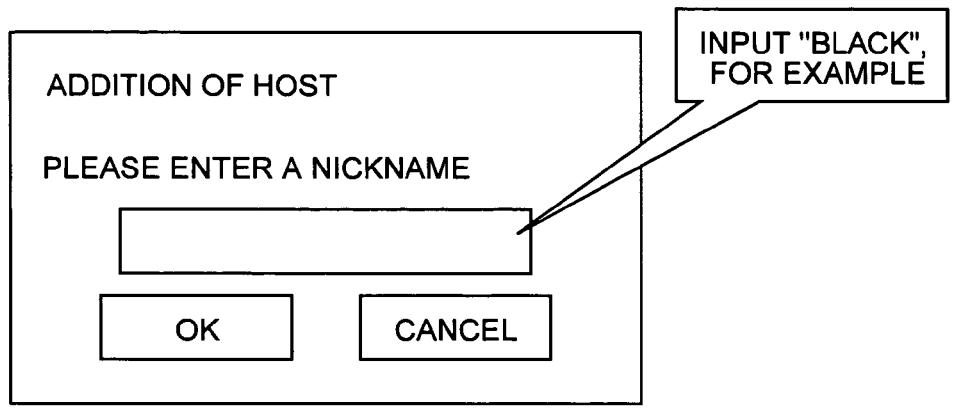
FIG. 7B
| HOST | CAPACITY (GB) |
|---|---|
| Black | |
| Yellow | 150 |
| White | 1000 |
| Red | 800 |
| Orange | 300 |
| Green | 1200 |
| Blue | 700 |
FIG. 7C
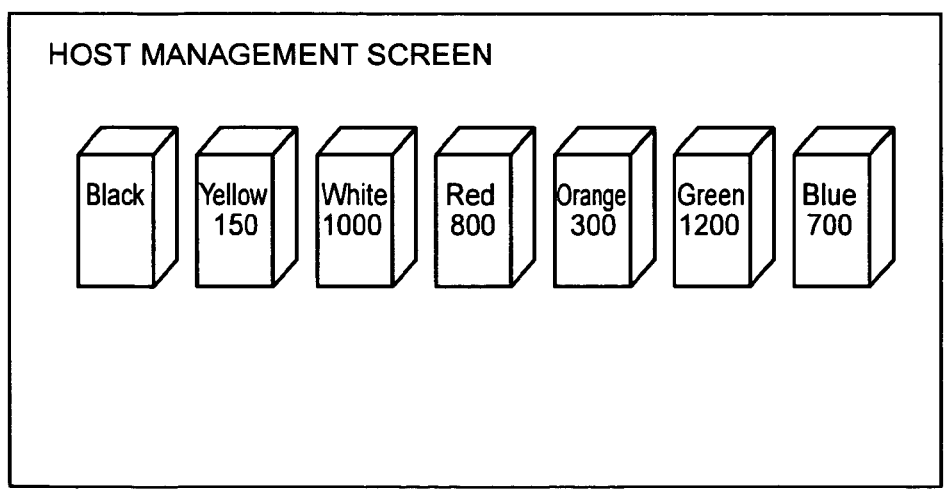

FIG. 10A
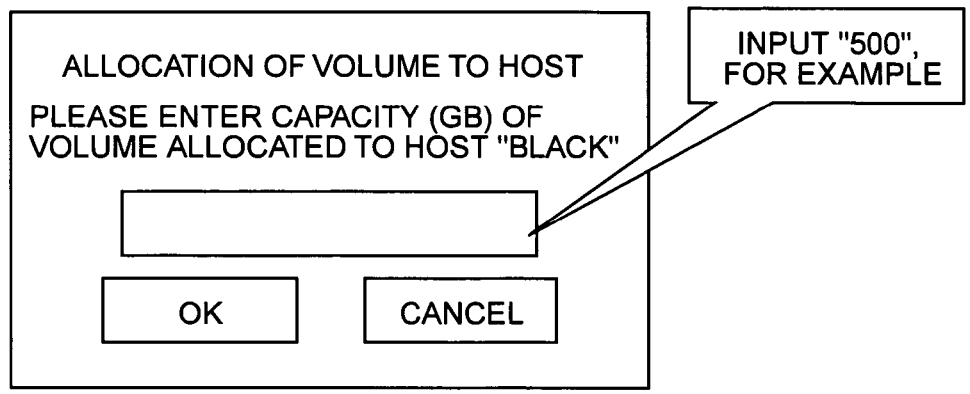
FIG. 10B
| HOST | CAPACITY (GB) |
|---|---|
| Black | 500 |
| Yellow | 150 |
| White | 1000 |
| Red | 800 |
| Orange | 300 |
| Green | 1200 |
| Blue | 700 |
FIG. 10C
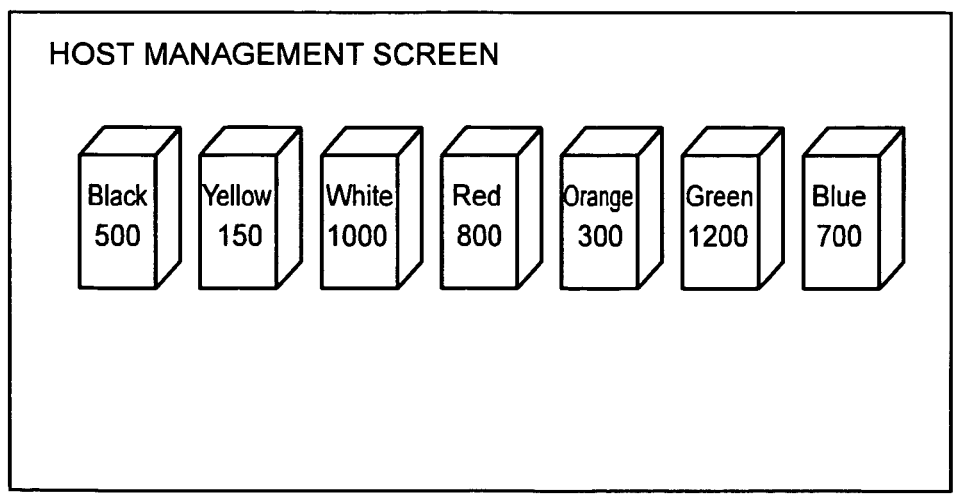

FIG. 15A

```

PLEASE ENTER STORAGE CAPACITY REQUIRED BY THE HOST (GB)
500

PLEASE ENTER THE NUMBER OF PORTS OF THE STORAGE SYSTEM
REQUIRED BY THE HOST
2

ARE THE REQUIREMENTS OF THE HOST AS FOLLOWS?
(YES/NO DEFAULT:YES)
STORAGE CAPACITY: 500GB
NUMBER OF PORTS OF THE STORAGE SYSTEM: 2 PORTS
```

FIG. 15B

```

THE REQUIREMENTS OF THE HOST WERE SET AS FOLLOWS:
STORAGE CAPACITY: 500GB
NUMBER OF PORTS OF THE STORAGE SYSTEM: 2 PORTS

```

FIG. 19A

LDEV MANAGEMENT TABLE 571

| LDEV NUMBER | HOST GROUP ID | PORT NUMBER | LUN | HBA-WWN |
|---|---|---|---|---|
| 00:01 | 0009 | CL1-g | 01 | 20000001730000942C |
| 00:12 | 0021 | CL1-a | 07 | 20020001730000911A |
| ... | ... | ... | ... | ... |

FIG. 19B

HOST GROUP MANAGEMENT TABLE 573

| HOST GROUP ID | OS NAME (HOST MODE NAME) | PORT NUMBER | HBA-WWN |
|---|---|---|---|
| 0009 | Windows | CL1-g | 20000001730000942C |
| 0021 | Solaris | CL1-a | 20020001730000911A |
| ... | ... | ... | ... |

```

PLEASE ENTER STORAGE CAPACITY REQUIRED BY THE HOST (GB)
500

PLEASE DESIGNATE PORT GROUP ALLOCATED TO THE HOST
PG-1

ARE THE REQUIREMENTS OF THE HOST AS FOLLOWS?
 (YES/NO DEFAULT:YES)
STORAGE CAPACITY: 500 GB
PORT GROUP:    PG-1
```

US 7,603,538 B2

ACCESS ENVIRONMENT CONSTRUCTION SYSTEM AND METHOD

CROSS-REFERENCE TO PRIOR APPLICATION

This application relates to and claims the benefit of priority from Japanese Patent Application No. 2006-305060, filed on Nov. 10, 2006 the entire disclosure of which is incorporated herein by reference.

BACKGROUND

The present invention relates to a technology for constructing an access environment to enable access by a host to a logical volume in a storage system.

For example, a computer system comprising a management server in which a host is connected to a storage system as disclosed in Japanese Patent Application No. 2006-268625 is known.

In a computer system of this type, by allocating a logical volume of the storage system to a host, the host is then able to use the logical volume. An example of the specific flow to the point where the logical volume is allocated to the host is as follows. Here, as the storage system, a storage system comprising a security function will be described by way of example. The security function is, for example, a function to ensure that, by associating the WWN ('HBA-WWN' hereinbelow) of the HBA (host bus adapter) of the host with the host port of the storage system (the port for accepting access requests transmitted by the host), a volume disclosure request (a command related to an inquiry such as an inquiry command, for example) that is sent by the HBA of an HBA-WWN which is different from the associated HBA-WWN is not accepted (received and processed) by the host port.

As a first step, the user of the management server allocates a logical volume of the capacity required by the host to a port of the host. In other words, the logical volume is connected to the host port. As a result, it is defined from which host port information related to which logical volume is supplied. Further, the storage system has a multiplicity of ports. The multiplicity of ports has a plurality of ports which are communicably connected to the host and a plurality of ports which are communicably connected to a plurality of storage devices, for example. However, the 'host port' signifies a port that is communicably connected to the host.

As a second step, the user allocates the WWN (World Wide Name) of the HBA (host bus adapter) that the host comprises to the host port. Information related to the logical volume connected to the host port (hereinafter volume information such as the LUN or capacity, for example) is supplied from the host port to the host that comprises the HBA with the WWN allocated to the host port.

As a third step, the host identifies an accessible logical volume based on the volume information supplied by the storage system.

According to the process flow above, the user must know the WWN of the HBA that the host comprises beforehand. This is considered to be a burden to the user. This problem can also occur in cases where another type of communication device and/or another type of communication device identifier is adopted instead of the HBA and/or WWN (for example, this problem can also arise in cases where an iSCSI name is adopted instead of the WWN). In more abstract terms, in instances where the storage system has a function for controlling which logical volume may be identified by which host by associating information related to the host environment ('host environment information' hereinbelow) with at least one of a host port and a logical volume, the user must know host environment information beforehand for each of the one or more hosts that exist in the computer system in order to construct an environment ('access environment' hereinbelow) to enable access by the host to a logical volume in the storage system.

SUMMARY

Therefore, it is an object of the present invention to be able to construct an environment to enable access by the host to a logical volume even when the user does not know host environment information beforehand.

Further objects of the present invention will become evident from the following description.

A computer system that comprises a host and a storage system comprises an access environment construction control section, a host environment information acquisition section, and a storage setting section. The host environment information acquisition section acquires the host environment information from the environment management section that is managing host environment information of the host and reports the host environment information thus acquired to the access environment construction control section. The storage setting section constructs an internal path which is a logical path in the storage system by allocating any of the plurality of logical volumes to any of the plurality of communication ports of the storage system, and allocates host environment information to at least one of the communication port and logical volume of the constructed path. The access environment construction control section receives a designation of a volume condition which is a logical volume-related condition from the user. Further, the access environment construction control section searches for a logical volume that matches the designated condition among the plurality of logical volumes. In addition, the access environment construction control section instructs the storage setting section to construct the internal path by allocating the logical volume thus found to any of the plurality of communication ports. Further, the access environment construction control section instructs the storage setting section to allocate host environment information from the host environment information acquisition section to at least one of the communication port and logical volume of the constructed internal path. As a result, if the host transmits a request for volume information which is logical volume-related information to the storage system and the host environment information of the host is adapted to the host environment information that is allocated to the communication port receiving the request and/or the logical volume of the internal path containing the communication port, volume information for the logical volume is received from the communication port and the logical volume can be identified.

Each of the above sections can be constructed by hardware, a computer program or a combination of hardware and a computer program (for example, some of the parts can be implemented by a computer program while the remainder is implemented by hardware). The computer program is read by a predetermined processor and executed. Further, during the information processing that is executed after the computer program is read by the processor, a storage area that exists in a hardware resource such as memory may suitably be used. In addition, the computer program may be installed on a computer from a recording medium such as a CD-ROM or may be downloaded to a computer via a communication network.

BRIEF DESCRIPTION OF THE DRAWINGS

FIG. 3 shows a constitutional example of a host information management table 321;

FIG. 4 shows a constitutional example of a volume information management table 323;

FIG. 5A shows a constitutional example of a host information management table 123;

FIG. 5B shows a constitutional example of an HBA information management table 125;

FIG. 7A shows an example of a host addition screen;

FIG. 7B shows an example of a host addition result display screen;

FIG. 7C shows another example of a host addition result display screen;

FIG. 10A shows an example of a volume allocation screen;

FIG. 10B shows an example of a volume allocation result confirmation screen;

FIG. 10C shows another example of a volume allocation result confirmation screen;

FIG. 15A shows an example of an input screen for accepting the input of the desired LDEV capacity and number of host ports and so forth from the host user;

FIG. 15B shows an example of an input result display screen that displays the results of the input;

FIG. 19A shows a constitutional example of the LDEV management table 591;

FIG. 19B shows a constitutional example of the host group management table 593;

DETAILED DESCRIPTION OF THE PREFERRED EMBODIMENTS

Figure 1:
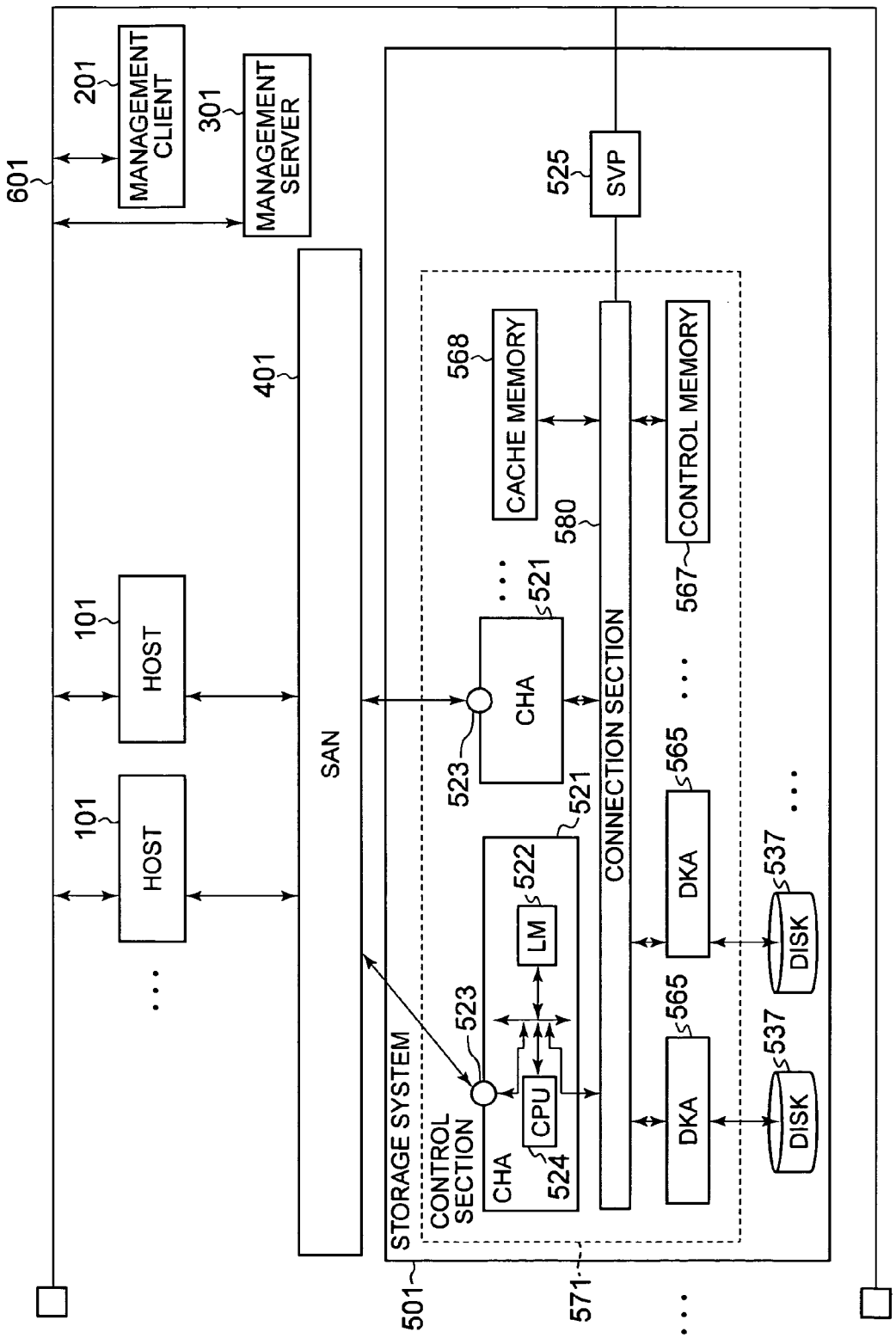
FIG. 1 is a block diagram that shows a constitutional example of a computer system according to a first embodiment of the present invention.

FIG. 1 is a block diagram that shows a constitutional example of a computer system according to an embodiment of the present invention.

A host 101 and storage system 501 are connected to a first communication network (SAN (Storage Area Network) 401, for example). The host 101 and storage system 501, and a management client 201 and management server 301 are connected to a second communication network (LAN (Local Area Network) 601, for example). The first and second communication networks may be single communication networks. Further, although one of each is shown, there may be a plurality of at least one of the host 101 and storage system 501.

The host 101 is a computer capable of reading and writing data with respect to a logical volume of the storage system 501 that will be described subsequently. The management client 201 is a computer which is a client of the management server 301. The management server 301 is a computer that manages the host 101 and storage system 501.

The storage system 501 comprises a control section 571, a plurality of disk-type storage devices (HDDs, for example) 537, and an SVP (Service Processor) 525.

The control section 571 controls the operation of the storage system 501. The control section 571 is able to receive a write request from the host 101, write data to the disk-type storage devices 537 in accordance with the write request, and receive a read request from the host 101 and transmit data from the disk-type storage devices 537 to the host 101 in accordance with the read request. The control section 571 comprises, for example, a plurality of channel adapters ('CHA' hereinafter) 521, a plurality of disk adapters ('DKA' hereinafter) 565, a cache memory 568, and a control memory 567.

The CHA 521 controls communications with the host 101. The CHA 521 is able to write data from the host 101 to the cache memory 568 and read data written by the DKA 565 from the cache memory 568 before transmitting same to the host 101. The CHA 521 comprises, for example, a plurality of host ports (communication ports) 523, a CPU 524, and a memory 522.

The DKA 565 controls communications with the disk-type storage device 537. The DKA 565 is able to write data from the disk-type storage devices 537 to the cache memory 568 and read data written by the CHA 523 from the cache memory 568 and write same to the disk-type storage devices 537. The DKA 565 is substantially able to adopt the same hardware constitution as that of the CHA 521.

The cache memory 568 is able to store data that have been exchanged between the host 101 and the disk-type storage devices 537. The control memory 567 is able to store information required to perform control of the storage system 501 (volume management information indicating which logical volume (not shown) is provided by which disk-type storage device 537, for example).

The connections between the CHA 521, cache memory 568, control memory 567, DKA 565 and SVP 525 are controlled by a connection section 580. The connection section 580 may be constituted by at least one of a switch (crossbar switch, for example), a bus, and a network.

The SVP 525 is an information processing terminal (a notebook-type personal computer, for example) for maintaining and managing the storage system 501. The SVP 525 is able to communicate with the CPU 524 in the CHA 521 and the CPU in the DKA 565 and so forth via the connection section 580, for example. The SVP 525 is able to monitor the occurrence of faults in the storage system 501 and display the faults on the display screen and also issue an instruction for closure processing of the disk-type storage device 537. Furthermore, the SVP23 can also be operated from a remote information processing terminal.

The above description is of a constitutional example of a computer system of this embodiment. Further, the above description is an example; further constitutions may also be adopted. For example, instead of the shared memory 25 and cache memory 24 being separate memories, there may be a shared memory region and a cache memory region provided in one memory. Furthermore, for example, the control section 20 maybe a circuit board that comprises a CPU, a memory, and a communication port. In this case, the CPU is able to execute the processing that is carried out by a plurality of CHA and DKA and so forth.

Figure 2:
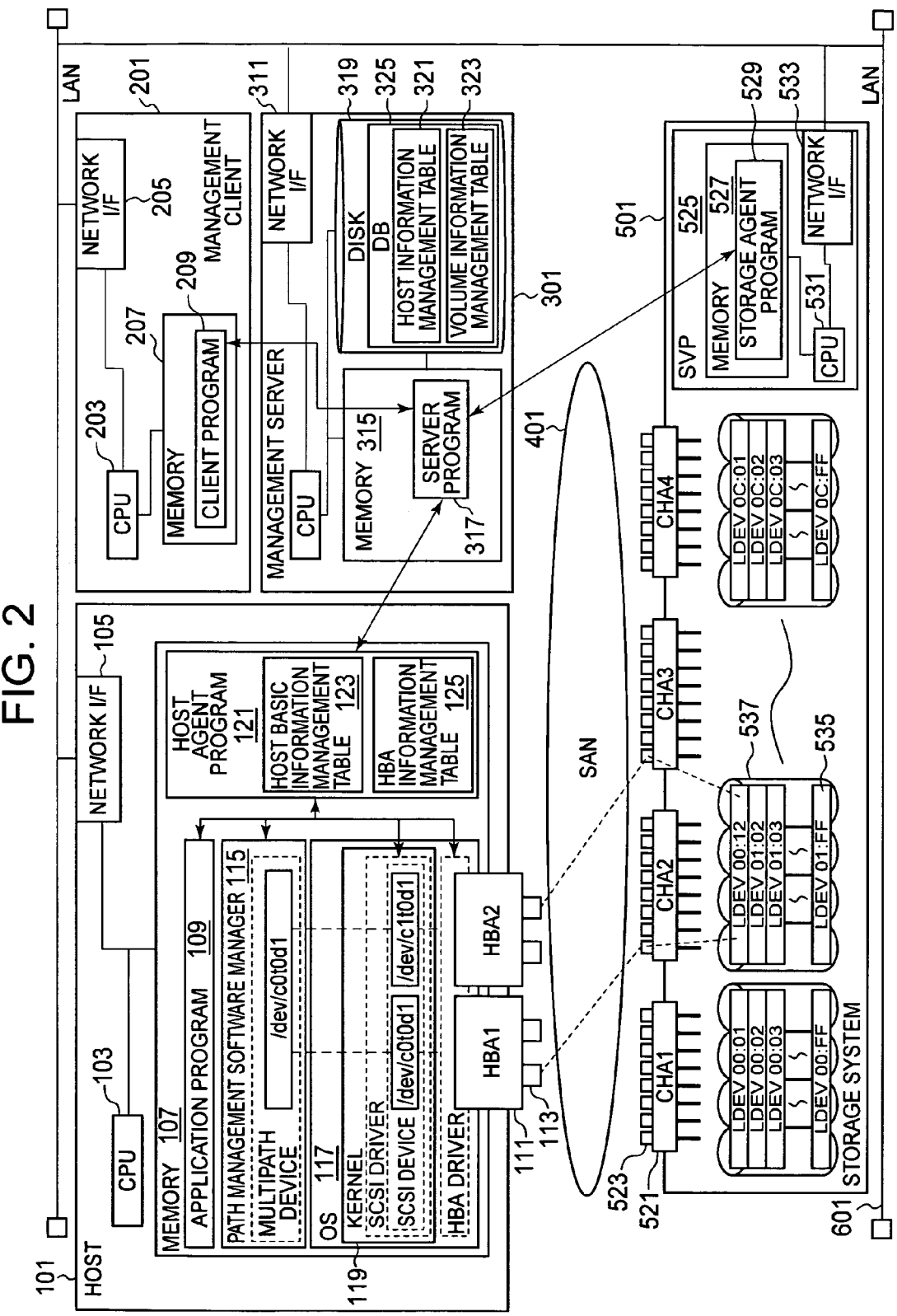
FIG. 2 shows an example of the constitution of a host, management client, management server, and storage system 501, as well as the computer program and data that each of the host, management client, management server, and storage system 501 comprise.

FIG. 2 shows an example of the constitution of a host, management client, management server, and storage system 501, as well as the computer program and data that each of the host, management client, management server, and storage system 501 comprise.

The management client 201 comprises, for example, a CPU 203, a storage resource (memory 207, for example), and a network interface device 205 that is connected to a LAN 601.

A client program 209 is stored in the storage resource of the management client 201 (memory 207, for example). The client program 209 is read and executed by the CPU 203. When a computer program is the subject hereinbelow, the processing is actually executed by the CPU that executes the computer program.

The client program 209 is a program that resides in the management client 201. The client program 209 sends instructions to a server program 317 and displays the results on the display screen (not illustrated) of the management client 201.

The management server 301 comprises, for example, a CPU 313, a storage resource (a memory 315 and disk-type storage device 319, for example) and a network interface device 311 that is connected to the LAN 601.

The storage resource of the management server 301 (the memory 315, for example) stores the server program 317. The server program 317 is a computer program that resides on the management server 301. The server program 317 interprets the instruction from the client program 209 and issues an instruction to the respective agent programs 121 and 529 of the host 101 and storage system 501.

The storage resource of the management server 301 (disk 319, for example) stores a DB (database) 325. The DB 325 comprises a host information management table 321 and a volume information management table 323. The constitutions of the respective tables will be described in detail hereinafter.

The SVP 525 comprises, for example, a CPU 531, a storage resource (memory 527, for example), and a network interface device 533 that is connected to a LAN 601.

The storage agent program 529 is stored in the storage resource of the SVP 525 (memory 527, for example). The storage agent program 529 receives instructions from the server program 317, and interprets and executes these instructions. Received instructions include, for example, the following four instructions:

(1) an access rights setting instruction;
(2) a volume copy instruction;
(3) a volume migration instruction; and
(4) a storage information report instruction.

An access rights setting instruction is an instruction for setting the access rights of a logical volume. Access rights setting instructions include, for example, the WWN of the HBA 111, the volume identifier (LUN, for example), and the host port identifier (port number, for example). Upon receiving an access rights setting instruction, the storage agent program 529 sets the WWN contained in the access rights setting instruction for the host port of the host port identifier contained in the access rights setting instruction and an access permission right for the logical volume of the volume identifier contained in the access rights setting instruction. As a result, the host 101 is then able to access the logical volume of the volume identifier via the HBA 111 having the WWN.

A volume copy instruction is an instruction to execute data copying between volumes. A volume copy instruction contains, for example, the identifier of a copy source volume group (one or a plurality of logical volumes) and the identifier of a copy destination volume group. Upon receiving a volume copy instruction, the storage agent program 529 causes a copy control program (not shown) that is executed by the CHA 521, for example, to execute data copying from the copy source volume group to the copy destination volume group that are designated by the volume copy instruction.

A volume migration instruction is an instruction to execute data migration between volumes. Data migration differs from data copying mentioned above in that the data do not remain in the migration source. A volume migration instruction contains, for example, the identifier of a migration source volume group and the identifier of a migration destination volume group. Upon receiving a volume migration instruction, the storage agent program 529 causes a migration control program (not shown) that is executed by the CHA 521, for example, to execute data migration from the migration source volume group to the migration destination volume group which are designated by the volume migration instruction.

A storage information report instruction is an instruction to report information related to the storage system. Upon receipt of the storage information report instruction, the storage agent program 529 reports, to the server program 317, the volume identifier of the storage system 501, the WWN set for the host port, and information related to the access permission rights of the logical volume (which logical volume can be accessed via which WWN).

The storage resource of the host 101 (memory 107, for example) stores an OS 117, a path management software manager 115, an application program 109 and a host agent program 121.

The kernel 119 of the OS 117 is software for mounting the basic functions of the OS 117. The kernel 119 is able to provide the basic functions of the OS 117 such as monitoring of a variety of computer programs (the path management software manager 115, for example), the management of resources such as disks and memory, and allocation processing, as a core part of the OS 117, for example.

The path management software manager 115 is a computer program that is able to integrate a plurality of paths to the logical volume (the subsequently described LDEV) 535 and provide redundant means of access to the logical volume 535 for a computer program at a higher level than the path management software manager 115.

The application program 109 run on an OS 117 and is able to acquire data read by the logical volume 535 and transmit data stored in the logical volume 535.

The host agent program 121 is a computer program that resides on the host 101. The host agent program 121 acquires information related to the host 101 and transmits the information to the server program. Further, the host agent program 121 uses the host basic information management table 123 and HBA information management table 125 (each table will be described subsequently). In addition, the host agent program 121 receives a command list from the server program 317 and issues commands to the OS117 and path management software manager 115 in accordance with the command list. Incidentally, the command list describes, for example, volume confirmation commands for the OS, multipath setting commands for the multipath software and so forth. Hence, commands issued by the host agent program 121 include volume identification commands, volume information collection commands, and multipath setting commands, for example.

In FIG. 2, 'multipath device' in a dotted line frame indicates a module that manages a multipath device in the path management software manager 115. The solid line frame in the dotted frame represents an instance of the module (multipath device) and '/dev/c0t0d1' indicates the name of the instance. The multipath device is a device (called 'HDEV' hereinbelow which is an abbreviation for 'host device') that is identified by a higher-level computer program (application program 109, for example) than the path management software 115 and a device in which a plurality of paths are extended between logical volumes (called 'LDEV' hereinbelow which is an abbreviation for 'logical device') in the storage system 501. In other words, in this embodiment, a logical volume identified in the storage system 501 is known as an 'LDEV' and a logical volume identified by the host 101 is known as a 'HDEV'. The LDEV is prepared based on the storage space of the RAID group, for example. The RAID group is constituted according to the rules of RAID (Redundant Array of Independent (or Inexpensive) Disks) and is a set of a plurality of the disk-type storage devices 537.

'SCSI device' in the dotted line frame indicates a module in a device driver (SCSI driver) that controls communications according to the SCSI protocol. Each solid line frame in the dotted line frame represents an instance of the module. '/dev/c0t0d1' and '/dev/c1t0d1' represent the respective instance names. One instance is prepared for each path.

The plurality of instances '/dev/c0t0d1' and '/dev/c1t0d1' of the SCSI device are associated with one instance '/dev/c0t0d1' of the path management software manager 115. Furthermore, an HBA-WWN (WWN of HBA) is associated with each of the plurality of instances '/dev/c0t0d1' and '/dev/c1t0d1' of the SCSI device.

A plurality of HBA-WWN are associated with the identifiers of a plurality of host ports. A LUN is associated with each of the identifiers of the plurality of host ports. The LUN is an abbreviation for Logical Unit Number and is a logical volume identifier designated by the host 101. An LDEV number is associated with the LUN and, by designating the LUN, the associated LDEV number can be specified. The LDEV number is the identifier of the LDEV that is used to specify the logical volume in the storage system 501.

As a result of the constitution above, a plurality of logical paths (two paths in the example of FIG. 2) are extended between one HDEV and one LDEV. Each path contains, for example, an HBA-WWN, a host-port port number, and a LUN. The path management software manager 115 is able to select, for example, a path among a plurality of paths that extend to the HDEV when an HDEV to which a plurality of paths are connected is designated by the application program 109 as the access destination and is able to access the LDEV associated with the HDEV via the selected path. In this embodiment, the formation of a plurality of logical paths between the HDEV and one LDEV can be performed even when the host user does not know the information setting method with respect to the path management software manager 115.

FIG. 3 shows a constitutional example of a host information management table 321.

The host information management table 321 is a table in which information related to the host is stored. The table 321 is used when carrying out virtual host creation processing, volume allocation processing, and volume setting processing (described subsequently).

Host basic information, OS information, and host group information are registered in the table 321 for each host.

The host basic information includes a nickname, host ID, host name, and IP address. The nickname is a term that is optionally designated by the user (described subsequently with regard to the advantages of the 'nickname' of this embodiment). The host ID is the identifier of the host and is a serial number, for example. The host name is the host name of the host and is reported by the host agent program 121. The IP address is the IP address of the host and is used in the communications with the host agent program 121.

OS information includes the name and version information (VR). The name is the name of the OS (Windows (registered trade name), Macintosh (registered trade name), or Solaris (registered trade name), for example). The version information is information indicating the version of the OS.

Host group information includes the host group ID (HG ID) and WWN. The host group ID is the identifier of a host group. WWN is the HBA-WWN set for the host group.

Further, in this embodiment, the storage system 501 has two security functions.

A first security function is the host mode function. Here, 'host mode' is the format of different I/O (that is, the I/O format) depending on the type of OS. In the storage system 501, a host mode can be associated with one or more LDEV that may be identified by the host 101. One or more LDEV with which the host mode is associated are called a 'host group' hereinbelow The host mode function is a function that performs I/O with respect to an LDEV when an I/O request to an LDEV in the host group is received in the associated host mode but which does not perform I/O with respect to the LDEV when an I/O request with respect to the LDEV in the host group is received in a mode other than the host mode. Further, in the storage system 501, a plurality of host groups can be associated with one host port 523.

A second security function is a LUN security function. In the storage system 501, an HBA-WWN can be associated with individual LUN (LDEV). The LUN security function is a function that discloses the LUN to the host 101 with the associated HBA-WWN (reports the LUN in response to an inquiry, for example) but which does not disclose the LUN to a host without the HBA-WWN.

In order to implement the two access control functions above, an LDEV management table 591 that is illustrated in FIG. 19A and a host group management table 593 that is illustrated in FIG. 19B, for example, are stored in the storage resources of the storage system 501 (the control memory 567 or the memory 524 of the CHA 521, for example). The LDEV management table 591 records, for each LDEV, the LDEV number, host group ID, port number, LUN, and HBA-WWN, for example. The host group management table 593 records, for each host group, the host group ID, OS name (host mode name), port number and HBA-WWN. The CHA 521 is able to control, based on the respective tables 591 and 593, which LUN is disclosed to which host 101 and which LUN can be accessed by which host 101.

FIG. 4 shows a constitutional example of a volume information management table 323.

The volume information management table 323 is a table for storing information related to the LDEV of the storage system 501 managed by the server program 317. The table 323 is used when carrying out virtual host creation processing, volume allocation processing, and volume setting processing (described subsequently).

This table 323 has, for each LDEV, the identifier of the LDEV (LDEV number), the storage capacity (capacity) of the LDEV, the model of the storage system comprising the LDEV (storage type), the identifier of the storage system comprising the LDEV (storage number), the LUN to which the LDEV is allocated, the identifier of the host port to which the LUN is allocated (port number), the state of the LDEV, and the identifier of the host using or reserving the LDEV (host ID). The host ID is the same ID as the host ID associated with the nickname. The states of the LDEV include for example, "unused", which signifies that the LDEV is not being used and has not been reserved by any host 101, "reserved", which signifies that the LDEV has been reserved, and "active", which signifies that the LDEV is being utilized. "reserved" and "active" have different meanings. For a certain host 101, the LDEV state "reserved" is a state where the LDEV is still not actually connected to (mounted on) the host 101 but is a candidate for such a connection, and is not going to be connected to the other host 101. Meanwhile, for a certain host 101, the LDEV state "active" is a state where the LDEV has been selected from among the LDEV in the LDEV "reserved" state (that is, the connection candidates mentioned above) and is actually connected to the host 101.

FIG. 5A shows a constitutional example of the host basic information management table 123.

The host basic information management table 123 is a table for storing information on the host 101 that comprises the table 123. The table 123 is used when host information collection processing, host information report processing, and volume setting processing (described subsequently) are performed.

This table 123 stores host basic information, OS information, and path management software manager information. The host basic information includes, for example, the name of the host 101 (the host name), and the IP address of the host 101. The OS information includes, for example, the name of the OS117 and the version information of the OS117. The path management software manager information includes, for example, the name of the path management software manager 115 and version information for the path management software manager 115.

FIG. 5B shows a constitutional example of the HBA information management table 125.

The HBA information management table 125 is a table for storing information related to the HBA 111. The table 125 is utilized when host information collection processing and host information report processing (described subsequently) are performed.

This table 125 records, for each HBA 111, the identifier of the HBA (serial number, for example), the name of the HBA, the identifier of the communication port of the HBA (port number), and the WWN allocated to the communication port. When one HBA has a plurality of communication ports, a plurality of sets of the port number and WWN are recorded for each HBA.

In this embodiment, several processes are executed. Executed processes include, for example, (1) virtual host creation processing, (2) volume allocation processing, (3) host information collection processing, (4) host information report processing, and (5) volume setting processing. Each of these processes will be described in detail hereinbelow.

<(1) Virtual Host Creation Processing>

Figure 6A:
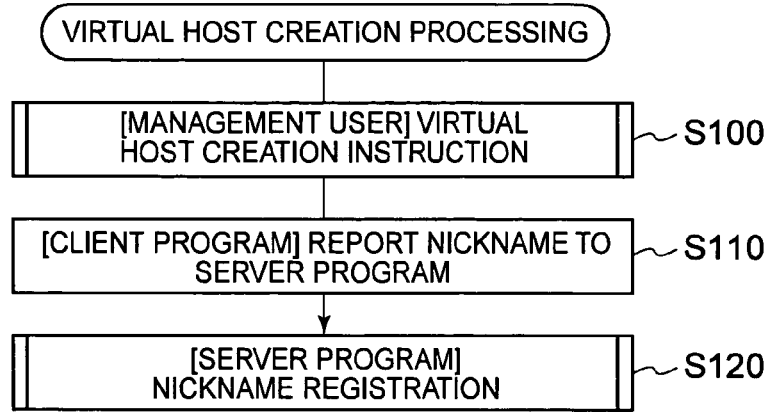
FIG. 6A shows a first part of an example of the flow of virtual host creation processing.
Figure 6B:
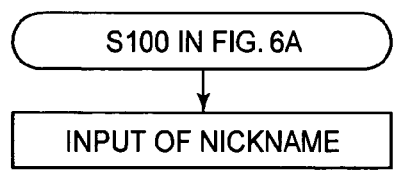
FIG. 6B shows a second part of an example of the flow of virtual host creation processing.
Figure 6C:
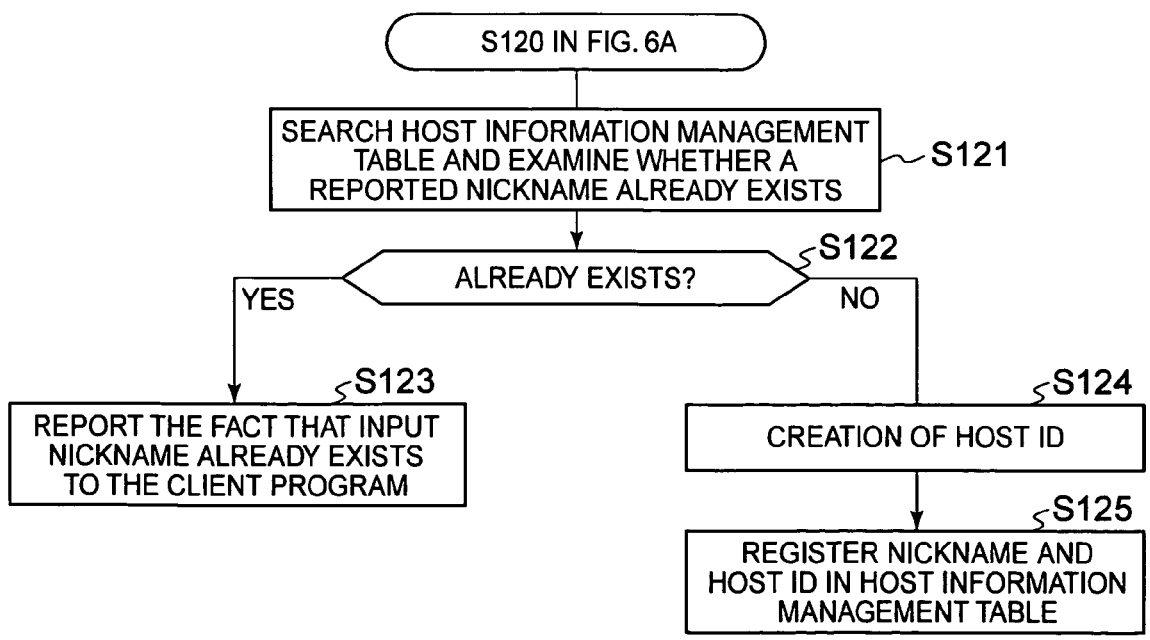
FIG. 6C shows a third part of an example of the flow of the virtual host creation processing.

An example of the flow of virtual host creation processing will be illustrated using a combination of FIGS. 6A, 6B, and 6C.

In virtual host creation processing, by assigning the management user a nickname, a virtual host can be created on the client program 209 and the host 101 can be managed and an LUN (LDEV) can be allocated (set) without identifying the HBA-WWN and OS of the host 101. Further, even in a state where the host 101 is not actually connected to the SAN 401, LDEV allocation is possible by putting the LDEV in a reserved (LDEV) state with respect to the host 101.

The virtual host creation processing is started when the management user inputs a command to create a virtual host to the client program 209.

In step S100 (details are shown in FIG. 6B), the client program 209 accepts the input of a nickname by displaying the host addition screen that is illustrated in FIG. 7A. The management user inputs the desired nickname ("Black", for example) and orders the creation of a virtual host with this nickname (clicks the 'OK' button, for example). As can also be seen from the example of the host addition screen, it is not clear if there is an association with the nickname. In other words, the management user adds a host by supplying a nickname. This is sufficient and there is no need to identify what kind of host (what kind of host with what kind of HBA-WWN or OS) the nickname is actually assigned to. This is beneficial to the management user.

The client program 209 reports the entered nickname to the server program 317 (S110).

Upon receiving the nickname report, the server program 317 performs processing to register the nickname. FIG. 6C shows an example of the flow.

In other words, the server program 317 searches the host information management table 321 using the reported nickname and examines whether the nickname already exists (S121)).

In S121, when it is known that the nickname already exists in the host information management table 321 (YES in S122), the server program 317 reports the fact that the nickname already exists to the client program 209. In this case, another nickname may be entered by the management user in S100, for example.

In S121, when it is known that the reported nickname does not exist in the host information management table 321 (NO in S122), the server program 317 creates a host management ID (host ID contained in the host basic information) (S124). This ID is a serial number, for example, and creates a serial number obtained by adding 1 to the last serial number at the current time. Further, the server program 317 registers the host ID and reported nickname in the host information management table 321 (S125).

Further, the server program 317 is able to report the fact that registration of the reported nickname is complete to the client program 209 when registration is complete in S125. In response to the report, the client program 209 is able to display the host addition result display screen illustrated in FIG. 7B and FIG. 7C. This screen displays a list of all the nicknames that exist in the host information management table 321 (the nicknames for which the completion of registration has been reported and that have been sent, for example), and the capacity allocated to the respective nicknames (the total capacity in an LDEV "reserved" state, for example). In all host addition result display screens, the allocated LDEV capacity is blank for nicknames that have just now been registered. As a result, it can be identified that, although the management user has added the host, an LDEV has not been allocated in any way to the host.

Virtual host creation processing was described hereinabove. A virtual host can be created by this processing. According to the above description, a 'virtual host' as it is termed in this embodiment refers to a host for which only a nickname and a host ID have been registered where the host information management table 321 is concerned. By associating information such as the host name, IP address, OS name, and so forth with the nickname and host ID, the virtual host is changed to a substantive host. If this is described taking FIG. 3 as an example, because the nicknames "White", "Orange", and "Blue" are not associated with information other than a nickname and host ID and so forth, this is a virtual host. Further, because "Black", "Yellow", "Red", and "Green" are associated with information other than a nickname and host ID and so forth, these are substantive hosts rather than virtual hosts.

<(2) Volume Allocation Processing>

Figure 8A:
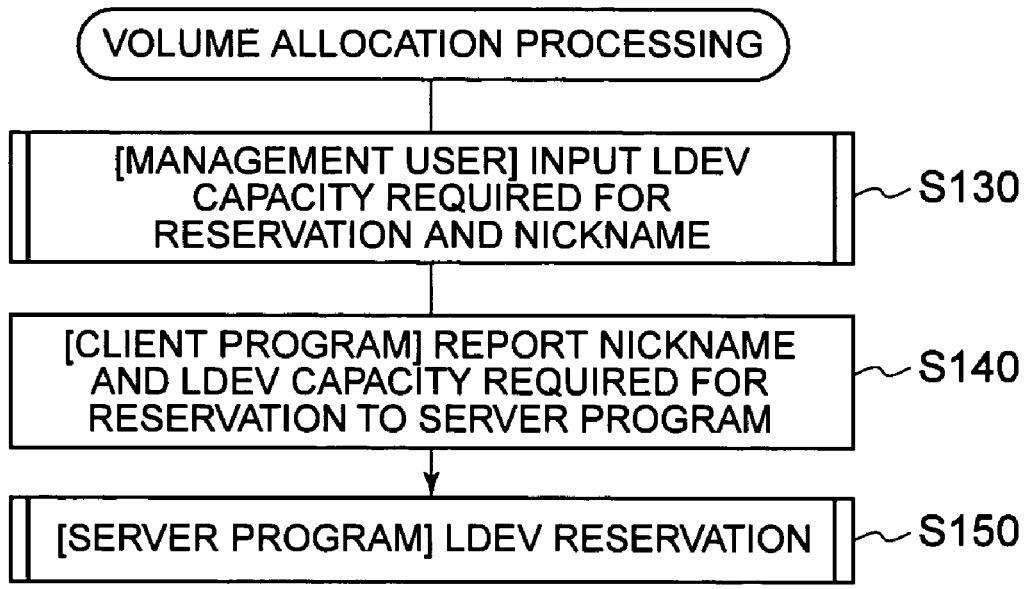
FIG. 8A shows a first part of an example of the flow of volume allocation processing.
Figure 8B:
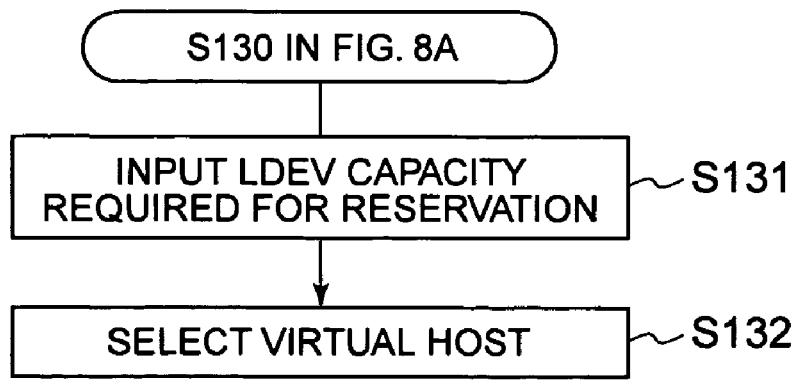
FIG. 8B shows a second part of an example of the flow of the volume allocation processing.
Figure 9:
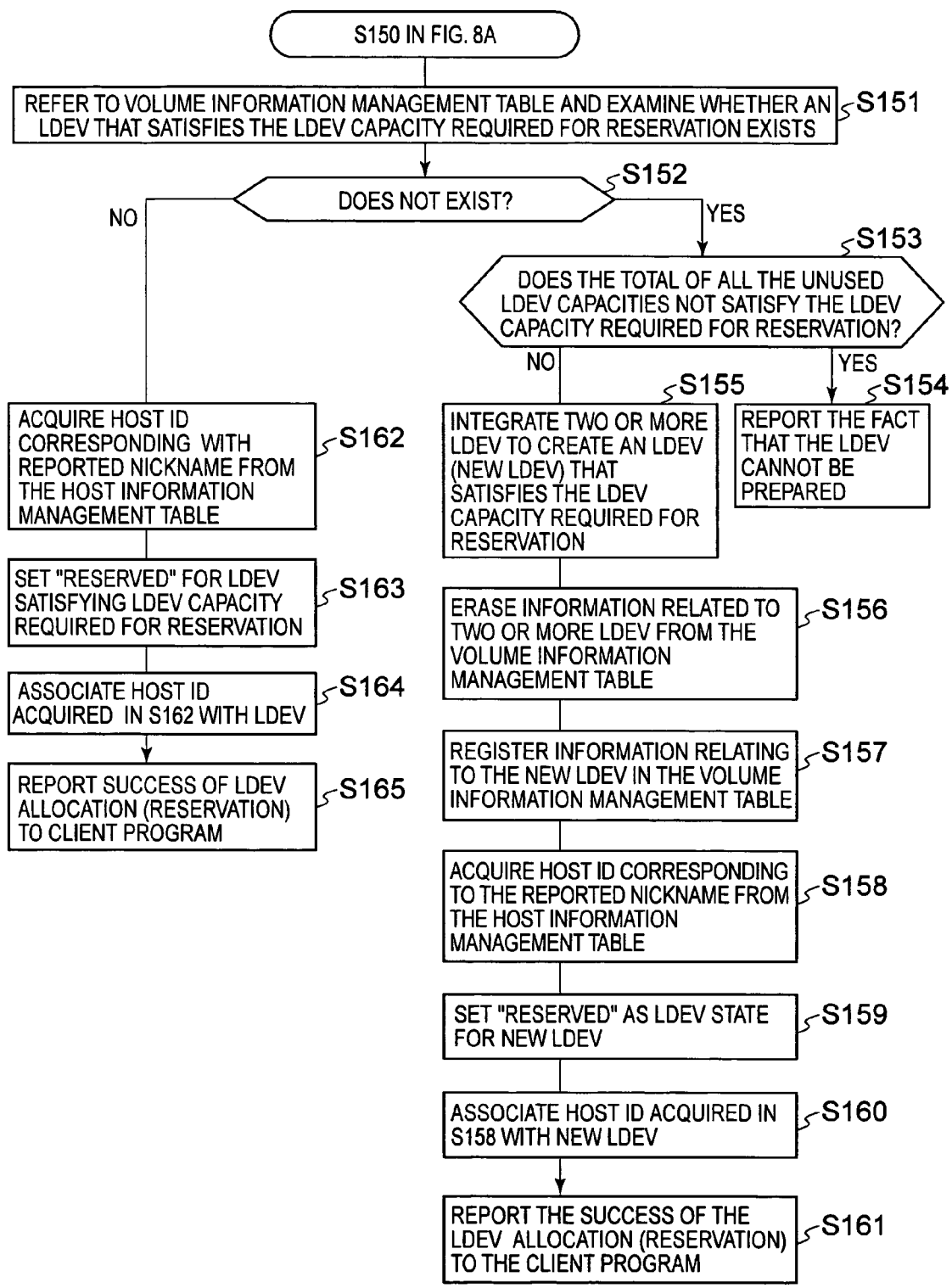
FIG. 9 shows a third part of an example of the flow of volume allocation processing.

An example of the flow of volume allocation processing will be illustrated by means of a combination of FIGS. 8A, 8B, and 9.

The volume allocation processing is processing that allocates an LDEV to a virtual host created using virtual host creation processing. Unused LDEV of the required capacity (in the LDEV state "unused") is detected by the storage system 501 and the LDEV state of the LDEV is set to "reserved". The required capacity here will be called the "LDEV capacity required for reservation" hereinbelow. The LDEV capacity required for reservation may be fixed or may be a value desired by the host user or management user.

The volume allocation processing is started when the volume allocation operation has been performed on the virtual host that the management user has created on the client program 209 after the end of virtual host creation processing, for example.

In S130 (the details are illustrated in FIG. 8B), the client program 209 accepts an input for the LDEV capacity required for reservation by displaying the volume allocation screen that is illustrated in FIG. 10A. The management user inputs the desired LDEV capacity required for reservation. Further, an example of this screen is a screen that is displayed in the subsequent processing after a nickname such as "Black" has been registered in the virtual host creation processing. Hence, although the LDEV capacity required for reservation for the LDEV allocated to the virtual host with the nickname "Black" comes to be input, a plurality of nicknames may be displayed in a selectable format. In that case, the management user selects a nickname in addition to the input of the LDEV capacity required for reservation. A plurality of nicknames displayed in a selectable format can be acquired by instructing the server program 317 to acquire a plurality of nicknames registered in the host management table 321, for example.

The client program 209 reports the LDEV capacity required for reservation that is input and the nickname of the virtual host constituting the LDEV allocation destination to the server program 317 (S140).

The server program 317 performs LDEV reservation processing when the report of the nickname and reservation required LDEV capacity is received. FIG. 9 shows an example of this process flow.

In other words, the server program 317 searches the volume information management table 323 by using the LDEV capacity required for reservation thus reported and examines whether an LDEV of the LDEV capacity required for reservation already exists (S151).

When, as a result of the examination of S151, when it is clear that an LDEV of the reported LDEV capacity required for reservation does not exist (YES in S152), S153 is executed.

In S153, the server program 317 references the volume information management table 323 and specifies the unused LDEV (the LDEVs in the LDEV state "unused") and the capacities thereof Further, the server program 317 judges whether the value obtained by adding the all the specified LDEV capacities is equal to or more than the LDEV capacity required for reservation. If this value is less than the LDEV capacity required for reservation, S154 is executed and if this value is equal to or more than the LDEV capacity required for reservation, S155 is executed. Further, in S153, in the specification of the unused LDEV, for example, an unused LDEV with the same "storage number" in the volume information management table 323 is specified. This is because, in the processing described subsequently, although one LDEV is newly created by two or more LDEV among the specified plurality of unused LDEV, in this embodiment, this one new LDEV cannot be extended across a plurality of storage systems.

In S154, the server program 317 reports the fact that an LDEV cannot be prepared by the reported LDEV capacity required for reservation (the LDEV is not allocated to the virtual host with the designated nickname) to the client program 209. In this case, for example, additional LDEV capacity required for reservation may be input by the management user in step 130.

In S155, the server program 317 newly creates an LDEV of the reported LDEV capacity required for reservation by selecting two or more LDEV among a plurality of unused LDEV specified in S153 and combining the capacities of these two or more LDEV. For example, when the LDEV capacity required for reservation is 500 GB (gigabytes) and there are two LDEVs with an LDEV capacity of 200 GB and 400 GB, an LDEV of 600 GB may be created by combining the two LDEV. Alternatively, these LDEV may be LDEV of 100 GB and 500 GB and an LDEV for which at least 500 GB which is the LDEV capacity required for reservation is secured is also sufficient.

In S156, the server program 317 erases information (rows) related to the two or more combined LDEV from the volume information management table 323.

In S157, the server program 317 adds information (rows) related to the newly created LDEVs to the volume information management table 323. Here, information other than the port number, LUN, state, and host ID, for example is registered. The registered LDEV numbers can be numbers that are automatically generated by a predetermined algorithm using unused LDEV numbers in the volume information management table 323, for example. The registered capacity can be the total of the two or more LDEV capacities. The registered storage types and storage numbers can be the storage types and storage numbers of the two or more LDEVs.

In accordance with S156 and S157, the server program 317 is able to transmit commands to erase information related to the two or more LDEV and to add information related to the created LDEV to the storage agent program 529. In this case, in response to the commands, the storage agent program 529 is able to erase information related to the two or more LDEV from the LDEV management table 591 exemplified in FIG. 19A and add information related to the newly created LDEVs (the LDEV numbers, for example) to the table 591.

Further, in S158, the server program 317 searches for the host ID corresponding with the nickname reported by the client program 209 from the host information management table 321.

In S159, the server program 317 sets the LDEV state "reserved" for the row added in S157.

In S160, the server program 317 sets the host ID found as a result of the search of S158 to the row added in S157.

In S161, the server program 317 reports the success of the volume allocation to the client program 209. The client program 209 is able to display a volume-allocation result confirmation screen that is exemplified in FIG. 10B or 10C in response to this report. This screen displays a list of all the nicknames that exist in the host information management table 321 (the nicknames that have been sent together with the report regarding the success of the allocation, for example) and the LDEV capacities allocated to the respective nicknames (more specifically, the total of one or more LDEV capacities for which the LDEV state is "reserved", for example), for example. On all the volume allocation result confirmation screens, the nicknames of the virtual hosts to which LDEVs have been allocated on this occasion and the newly allocated LDEV capacities are displayed differently (a so-called 'highlighted display') from the other nicknames and LDEV capacities. As a result of this screen, the management user is able to identify which nicknames are those nicknames which he has designated himself and how much LDEV-capacity has been allocated to the virtual host with that nickname.

Further, as a result of the examination of S151, when unused LDEV having capacities equal to or more than the LDEV capacity required for reservation that has been reported ('target unused LDEV' hereinbelow) exist (NO in S152), the server program 317 retrieves the host ID that corresponds to the nickname reported by the client program 209 from the host information management table 321 (S162). Further, the server program 317 sets the LDEV state "reserved" for the row corresponding with the target unused LDEV in the volume information management table 323 (S163). Furthermore, the server program 317 sets the host ID found in the search of S162 for the row. Thereafter, the server program 317 reports the success of the volume allocation to the client program 209. The client program 209 is able to display the volume allocation result confirmation screen exemplified in FIG. 10B or 10C mentioned earlier in response to the report.

The volume allocation processing was described hereinabove. As a result of this processing, an LDEV with a capacity equal to or more than the LDEV capacity required for reservation can be allocated to (reserved for) the nickname (virtual host) desired by the management user.

<(3) Host Information Collection Processing>

Figure 11A:
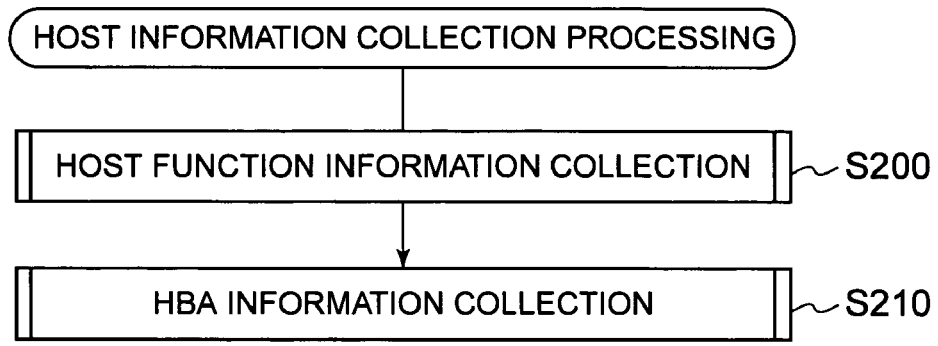
FIG. 11A shows a first part of an example of the flow of host information collection processing.
Figure 11B:
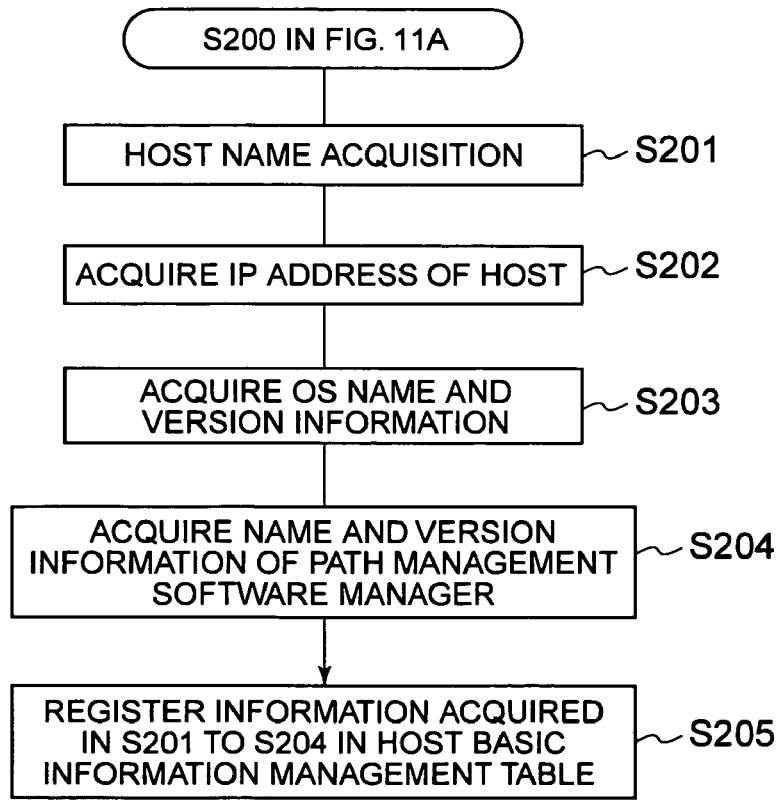
FIG. 11B shows a second part of an example of the flow of host information collection processing.
Figure 12:
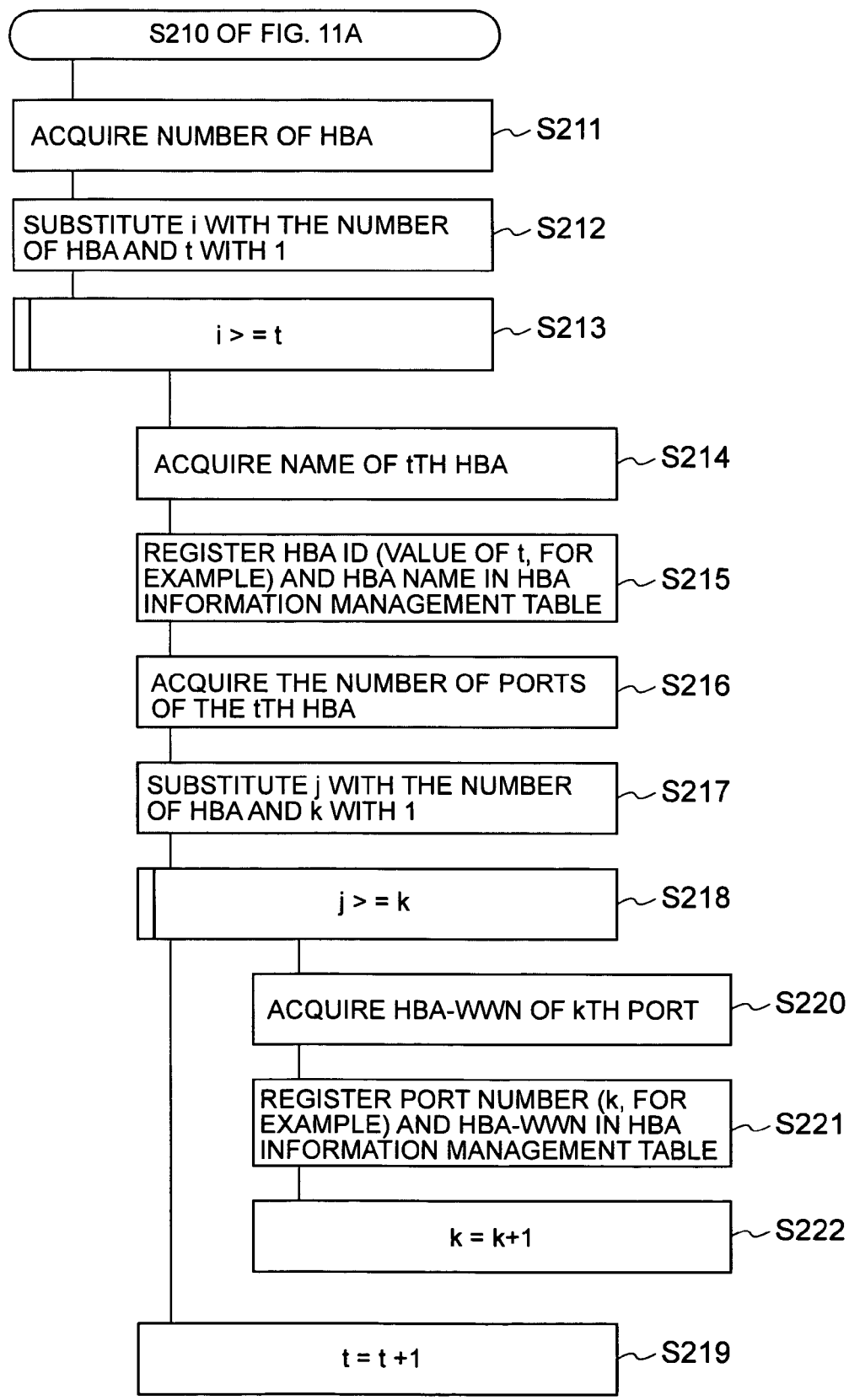
FIG. 12 shows a third part of an example of the flow of host information collection processing.

An example of the flow of the host information collection processing will be illustrated by means of a combination of FIGS. 11A, 11B, and 12.

The host information collection processing is processing that collects information related to the host 101 (host name, IP address, OS name, OS version information, the name and version information of the path management software manager), stores the collected information in the host basic information management table 123, collects, collects information related to the HBA of the host 101, and stores the collected information in the HBA information management table 125.

As the timing for executing the host information collection processing, any of the following events (a) to (e), for example, can be adopted:

(a) when the host agent program 121 collects information related to the host 101 and transmits same to the server program 317;

(b) when the client program 209 requests host information collection processing;

(c) when the host agent program 121 is restarted;

(d) when the host agent program 121 is started; and (e) when the host 101 itself is restarted.

In the host information collection processing, host function information collection (S200) and HBA information collection (S210) are executed.

In the host function information collection, as shown in FIG. 11B, the host agent program 121 acquires the host name, IP address, OS name, and version information of the host, the name and version information of the path management software manager 115 by means of an inquiry to the OS 117 (S201 to S204), and stores the information thus acquired in the host basic information management table 123 (S205).

In the HBA information collection, as shown in FIG. 12, the host agent program 121 acquires the number of the HBA111 of the host 101 by issuing an inquiry to the HBA driver. The host agent program 121 substitutes i with the number of HBA thus acquired and substitutes t with 1 (S212).

S213 represents first loop processing. S214 to S219 below are repeated while $i \geq t$. In other words, S214 to S219 below are executed for all HBA 111.

In S214, the host agent program 121 acquires the name of the $t^{th}$ HBA by issuing an inquiry to the HBA driver.

In S215, the host agent program 121 registers the HBA name thus acquired in the HBA information management table 125.

In S216, the host agent program 121 acquires the number of ports of the $t^{th}$ HBA by issuing an inquiry to the HBA driver.

In S217, the host agent program 121 substitutes j with the acquired port number and substitutes k with 1.

S218 represents second loop processing. S220 to S222 (described subsequently) are repeated while $j \geq k$. In other words, S220 to S222 are executed for all ports for each HBA111.

In S219, the host agent program 121 adds 1 to the current t. As a result, if the updated t exceeds i (number of HBA), HBA information collection is complete and, if i is not exceeded, S214 is performed for the $t^{th}$ HBA.

In S220, the host agent program 121 acquires the HBA-WWN of the kth port by issuing an inquiry to the HBA driver.

In S221, the host agent program 121 registers the acquired HBA-WWN and the kth HBA port number in the column corresponding to the HBA name registered in S205 of the HBA information management table 125.

In S222, the host agent program 121 adds 1 to the current value of k. As a result, if the updated value of k exceeds j (the number of HBA ports), the second loop processing is complete and, if j is not exceeded, S220 is executed for the kth port.

Host information collection processing was described above. As a result of this processing, information is registered in the host basic information table 123 and the HBA information management table 125 and so forth. Further, the host information collection processing is executed in cases where the HBA is exchanged and the host agent program 121 or the host 101 itself is restarted or in instances where the host 101 breaks down due to a fault or the like and is exchanged and the host 101 itself is started up. Hence, information that is recorded in the host basic information management table 123 and HBA information management table 125 can be information that is used during startup or during re-start.

<(4) Host Information Report Processing>

Figure 13A:
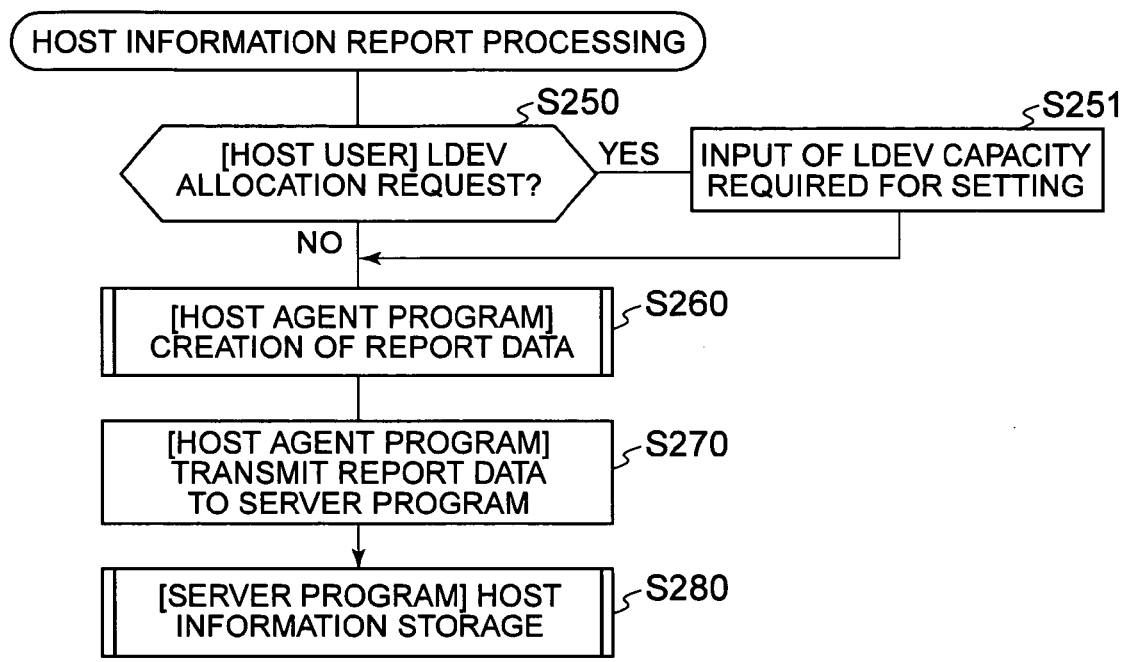
FIG. 13A shows a first part of an example of the flow of host information report processing.
Figure 13B:
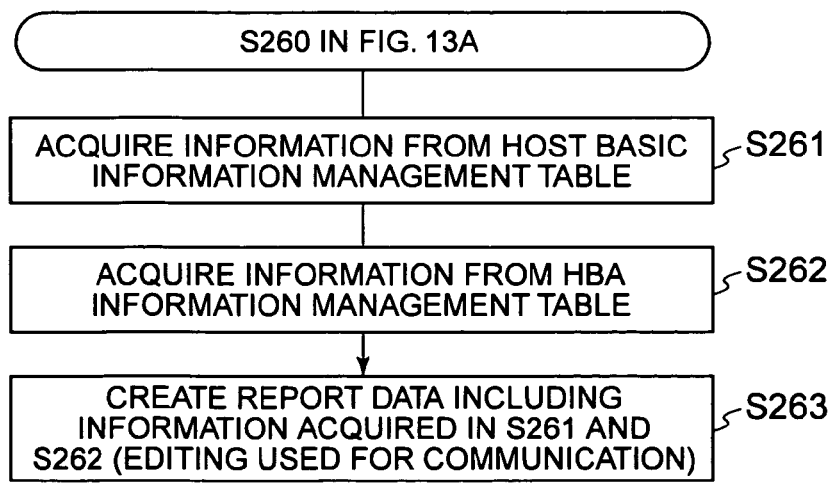
FIG. 13B shows a second part of an example of the flow of host information report processing.
Figure 14:
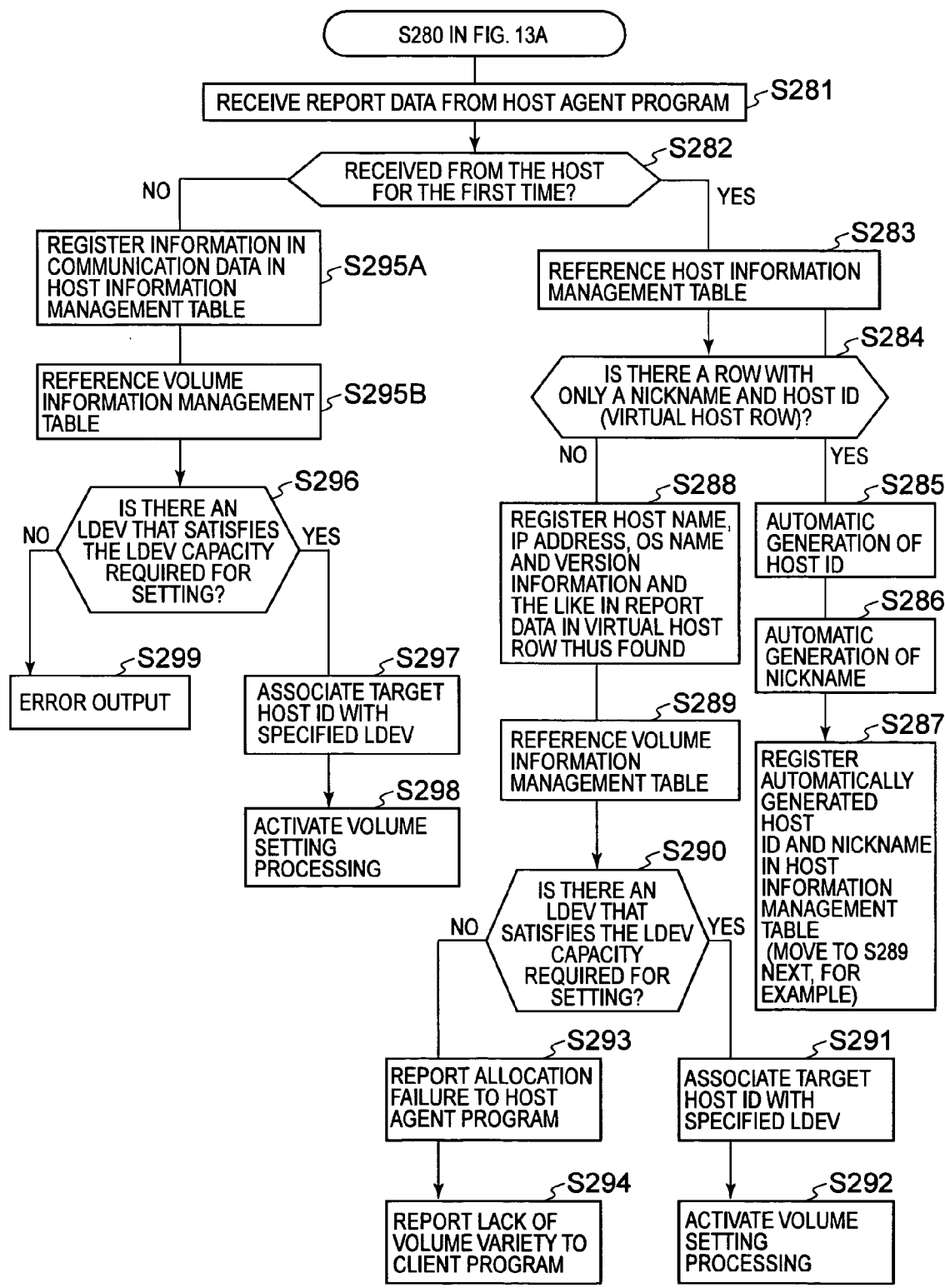
FIG. 14 shows a third part of an example of the flow of host information report processing.

An example of the flow of host information report processing is shown by means of a combination of FIGS. 13A, 13B, and 14.

Host information report processing is processing that reports information that has been registered in the host basic information management table 123 and HBA information management table 125 to the client program 209 via the server program 317.

As the timing for executing the host information report processing, any of the following events (a) to (e), for example, can be adopted:

(a) when the host agent program 121 collects information related to the host 101 and transmits same to the server program 317;

(b) when the client program 209 requests host information collection processing;

(c) when the host agent program 121 is restarted;

(d) when the host agent program 121 is started; and (e) when the host 101 itself is restarted.

The host agent program 121 accepts an input of the capacity and number of host ports (S250) by displaying an input screen exemplified in FIG. 15A in instances where a volume allocation request is received from the host user (user of the host 101) (YES in S250). The host user inputs the LDEV capacity and number of host ports to be allocated to the host 101 (S251). The LDEV capacity and number of host ports that are input here will be called the 'LDEV capacity required for setting' and 'required number of host ports' hereinbelow. Further, when the capacity thus input is set (more specifically, the LDEV number, capacity, storage type, storage number, and port number (port numbers for the required number of host ports), LUN and host ID are registered in the volume information management table 323 for the LDEVs with a capacity equal to or more than the LDEV capacity required for setting), the input result display screen exemplified in FIG. 15B is displayed.

The host agent program 121 performs host information edit processing (S260). More specifically, as exemplified in FIG. 13B, for example, the host agent program 121 acquires information from each of the host basic information management table 123 and the HBA information management table 125 (S261 and S262) and edits the acquired information to be used as communication data (S263). As a result of S263, communication data that include information recorded in the host basic information management table 123 and HBA information management table 125 are created. As a result of S251 being executed, when the LDEV capacity required for setting and the required number of host ports are input, this information is also included.

The host agent program 121 transmits the communication data to the server program 317 (S270).

The server program 317 performs host information storage processing (S280).

More specifically, as shown in FIG. 14, the server program 317 receives communication data (S281) and judges whether the communication data have been received from the host 101 that is the transmission source of the communication data for the first time (S282). For example, when the communication data are received, the server program 317 judges whether identification information on the transmission source host of the communication data (host name, IP address and so forth) is registered in a predetermined storage region. If identification information is registered, it is judged that communication data have not been received for the first time and, if the identification information is not registered, it is judged that communication data have been received for the first time, and identification information on the transmission source host can then be registered in the predetermined storage region.

When it is judged in S282 that communication data have been received for the first time (YES in S282), the server program 317 references the host information management table 321 (S283) and judges whether only the nickname and host ID have been registered, in other words, whether there is a virtual host (S284).

If there is no virtual host (YES in S284), the server program 317 automatically generates a host ID and a nickname (S285 and S286) and newly creates a virtual host by registering the host ID and nickname in the host information management table 321 (S287). Thereafter, the processing is able to advance to S289, for example.

However, if there are one or more virtual hosts (NO in S284), the server program 317 associates the host name, IP address, OS name, OS version information, and the name and version information of the path management software manager that are specified from the communication data received in S281 with any virtual host (the virtual host that was found first, for example) (S288).

The server program 317 references the volume information management table 323 if the LDEV capacity required for setting and required host port number are contained in the received report data (S289) and judges whether there are reserved state LDEVs (LDEVs in the LDEV state "reserved") with a capacity equal to or more than the LDEV capacity required for setting (S290).

If it is judged in S290 that such an LDEV is present (YES in S290), the server program 317 associates the target host ID with the reserved state LDEV with a capacity equal to or more than the LDEV capacity required for setting in the volume information management table 323 (S291). Activation of the volume setting processing is then executed (S292). Further, the target host ID is the host ID of the virtual host in S288 or the host ID registered in S287 in the host information report processing.

If it is judged in S290 that such an LDEV is not present (NO in S290), the server program 317 reports the fact that the volume allocation has failed to the host agent program 121 (S293). Further, the server program 317 reports the fact that the volume variety (capacity of the reserved state LDEV) is insufficient to the client program 209 (S294). Thereupon, this report can be issued together with the nickname corresponding with the host ID (the host ID registered in S287 or the host ID of the virtual host in S288). If, upon receipt of the report, the client program 209 displays the fact that the volume variety is insufficient and the virtual host for which the insufficiency has occurred, the management user is able to specify which virtual host may execute volume allocation processing.

When S290 yields a NO, the same processing as that in S153 and S155 in FIG. 9 may be executed in place of S293 and S294, that is, by combining two or more LDEVs in the reserved state, a reserved state LDEV with a capacity equal to or more than the LDEV capacity required for setting may be created and the target host ID may be associated with this reserved state LDEV.

Further, when it is judged that the communication data have been received from the host 101 for the first time in S282 (NO in S282), the server program 317 registers the various information in the communication data received in the rows corresponding with the transmission source host (host name, for example) in the host information management table 321 (S295A). Further, if the received communication data contains the LDEV capacity required for setting and required host port number, the server program 317 references the volume information management table 323 (S295) and judges whether there is a reserved state LDEV with a capacity equal to or more than the LDEV capacity required for setting (LDEVs in the LDEV state "reserved") (S296). When it is judged in S296 that such an LDEV exists, the same processing as that of S291 and S292 is performed (S297 and S298). However, when it is judged in S297 that no such LDEV exists, the server program 317 outputs an error (S299).

The host information report processing was described hereinabove. The host information report processing is also executed in instances where the HBA is exchanged and the host agent program 121 or host 101 itself is restarted as well as cases where a certain host 101 breaks down due to a fault or the like and is exchanged and the host 101 itself is started up. Hence, the information that is recorded in the host information management table 321 or volume information management table 323 can be information during a restart or startup.

<(5) Volume Setting Processing>

An example of the flow of volume setting processing will now be illustrated by means of a combination of FIGS. 16A, 16B, 17A, and 17C.

As the execution timing for the volume setting processing, any of the following events (a) to (c), for example, can be adopted:

(a) when activation of the volume setting processing is performed in the host information report processing;

(b) when the host 101 is newly connected to the SAN 401 and the host agent program 121 is activated;

(c) when information related to the HBA of the host 101 changes (the HBA is exchanged or the N+1 hot standby constitution is switched, for example) and the agent program is reactivated.

In the volume setting processing, at least one of the following processes is carried out: the setting of the path of the storage system (S350), the setting of the security function (S360), the identification of the LDEV by the host (S370), and multipath setting (S380).

Figure 16A:
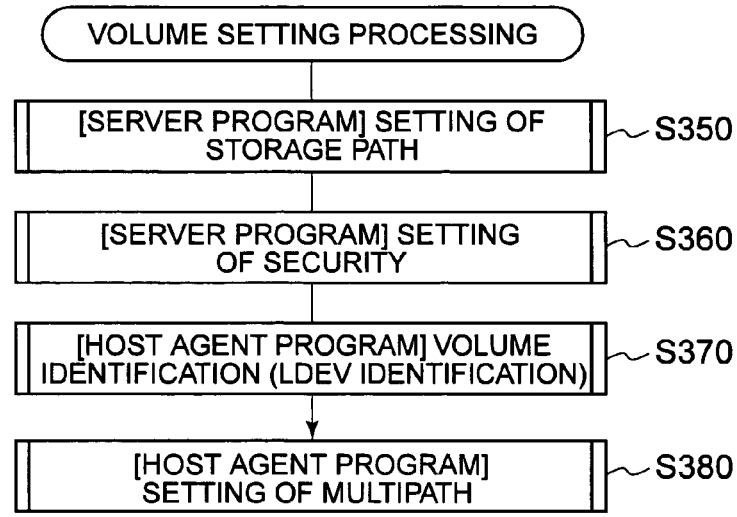
FIG. 16A shows a first part of an example of the flow of volume setting processing.
Figure 16B:
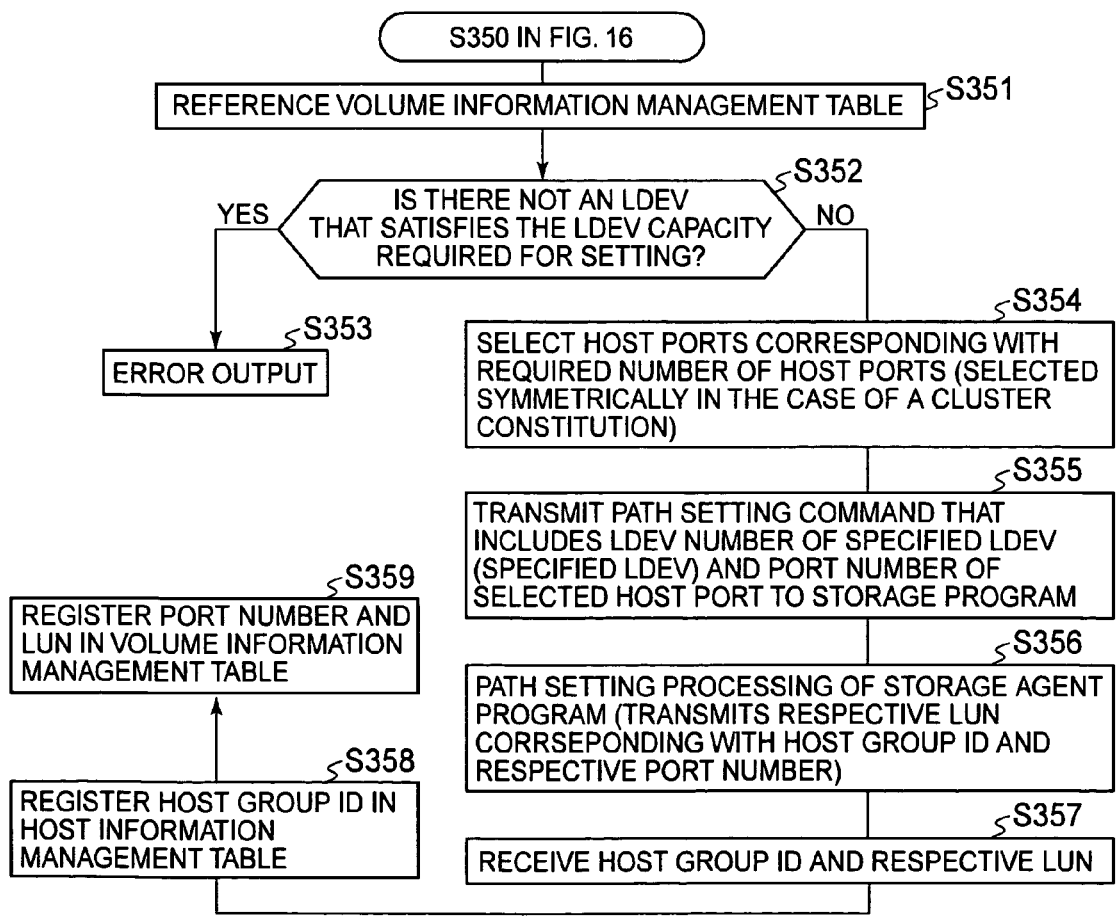
FIG. 16B shows a second part of an example of the flow of volume setting processing.

In the setting of the path of the storage system (S350 in FIG. 16A), as shown in FIG. 16B, the server program 317 references the volume information management table 323 (S351) and judges whether there is not a reserved state LDEV with a capacity equal to or more than the LDEV capacity required for setting (S352). When it is judged that there is no such LDEV (YES in S352), an error is output (S353).

When it is judged that such an LDEV exists (NO in S352), the server program 317 selects host ports in a quantity corresponding to the required number of host ports from the storage system that comprises the reserved state LDEV specified in the judgment of S352 (S354). More specifically, for example, the storage number corresponding with the LDEV number of the specified reserved state LDEV can be specified from the volume information management table 323 and a request for constitution information related to the constitution of the storage system 501 can be issued to the storage agent program 529 of the storage system 501 with the specified storage number. Constitution information is sent from the storage agent program 529. This constitution information contains, for all of the host ports of the storage system 501, the port number and the CHA in which the port is installed. The server program 317 is able to select port numbers in a quantity corresponding with the required host ports from a plurality of port numbers contained in the constitution information. Thereupon, the server program 317 is able to select port numbers symmetrically by means of the cluster constitution. More specifically, for example, the CHA1 and CHA2 constitute a cluster constitution and when the required number of host ports is two, the port number belonging to CHA1 and the port number belonging to CHA2 are selected instead of selecting two port numbers belonging to CHA1. As a result, even when a fault occurs with CHA1, the LDEV can be accessed via the path that contains the port number of CHA2.

In S355, the server program 317 transmits a path setting command containing the LDEV number and the selected port number of the reserved state LDEV thus specified to the storage agent program 529 discriminated from the storage number corresponding with the LDEV number.

In S356, setting of the path in the storage system 501 is performed by the storage agent program 529 in accordance with the path setting command. More specifically, for example, the LDEV number contained in the path setting command is associated with plurality of port numbers contained in the path setting command. More specifically, in the storage system 501, the LUN are associated with the respective host ports and, as a result of the path setting, a path (logical path) that contains the port number, LUN, and LDEV number is created. Further, in cases where LDEV numbers are allocated to port numbers, when the host group has already been allocated by means of the LDEV corresponding with the LDEV number allocated to the port number, the storage agent program 529 now includes the LDEV corresponding with the LDEV number newly allocated to the port number in the host group. If a host group ID is newly generated when an LDEV number is allocated for the first time to the port number, the LDEV number allocated at the time is associated with the host group ID. In other words, the storage agent program 529 automatically constitutes the host group and updates the constitution of the host group. When the path setting has ended, the storage agent program 529 makes a transmission to the server program 31 with regard to which LUN is associated with which of the plurality of port numbers contained in the path setting command to the server program 317 and transmits the host group ID of the host group to which the LDEV with the currently allocated LDEV number belongs to the server program 317.

In S357, the server program 317 receives the LUN corresponding with the respective port numbers selected in S354 and the host group ID.

In S358, the server program 317 associates the received host group ID with the specified LDEV number (registers the host group ID in the volume information management table 323).

In S359, the server program 317 associates the respective LUN thus received and each of the respective port numbers thus selected that correspond with the respective LUN with the specified LDEV numbers (registers same in the volume information management table 323).

Figure 17A:
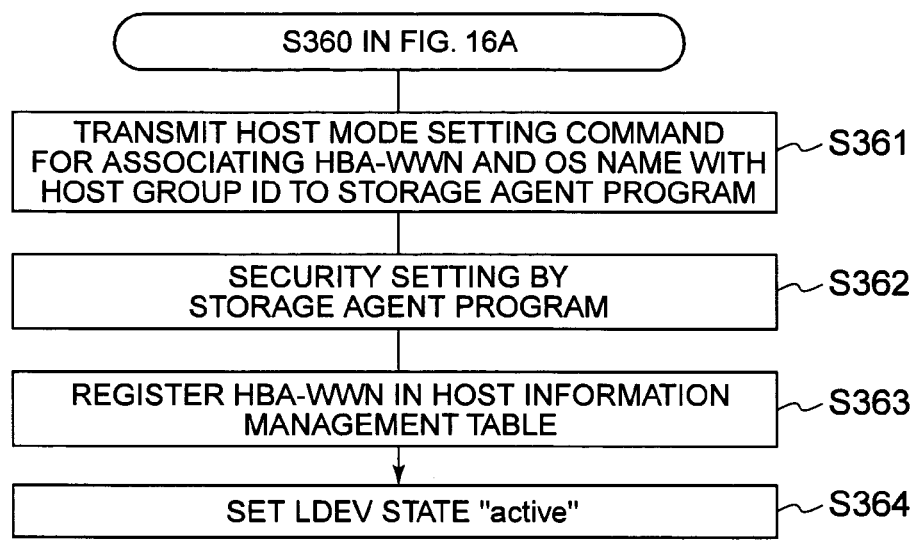
FIG. 17A shows a third part of an example of the flow of volume setting processing.

Further, in setting the security function (S360 in FIG. 16A), as shown in FIG. 17A, the server program 317 transmits a command to set the WWN and OS name to the host group ID received in S357 (host mode setting command) to the storage agent program 529 (S361). The WWN and OS name here are the WWN and OS name contained in the report data received in S283 of FIG. 14, for example.

In S362, the storage agent program 529 receives a host mode setting command and executes security setting in accordance with this command. More specifically, for example, the storage agent program 529 sets the WWN and OS name contained in the host mode setting command for the host group ID that is the same as the host group ID contained in the host mode setting command (the storage agent program 529 associates the OS name and WWN (HBA-WWN) with the host group ID on the host group management table 593 exemplified in FIG. 19B, for example).

In S363, the server program 317 associates the HBA-WWN and host group ID contained in the host mode setting command with the target host ID (the host ID registered in S287 or the host ID of the virtual host in S288, for example) in the host information management table 321.

In S364, the server program 317 changes the LDEV state "reserved" corresponding with the specified LDEV number to "active" in the volume information management table 323. In this case, the server program 317 is able to issue an instruction to the host agent program 121 to execute volume identification.

Figure 17B:
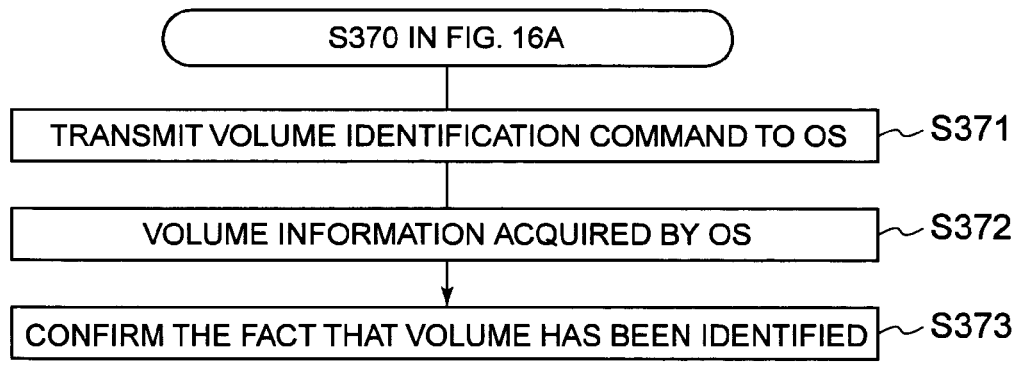
FIG. 17B shows a fourth part of an example of the flow of volume setting processing.

Further, in the volume identification (S370 in FIG. 16A), as shown in FIG. 17B, the host agent program 121 issues a volume identification command to the OS117 in response to the volume identification instruction from the server program 317, for example (S371). As a result, the OS117 issues a predetermined inquiry command and the inquiry command thus issued is output via the communication port of each HBA 111. The HBA-WWN and OS name and so forth can be specified from the inquiry command. The storage system 501 that receives the inquiry command reports information (the LDEV capacity or LDEV number, for example) related to the LDEV belonging to the host group to which the HBA-WWN is allocated via the port if the host port that receives the inquiry command is a port associated with the HBA-WWN and OS name discriminated from the inquiry command. As a result, the OS117 is able to acquire information related to the LDEV (volume information; more specifically, one row's worth of information in the volume information management table 323, for example) (S372) and identify the LDEV. The host agent program 121 is able to confirm whether the LDEV has been identified by issuing an inquiry in this regard to the OS117 (S373).

Figure 17C:
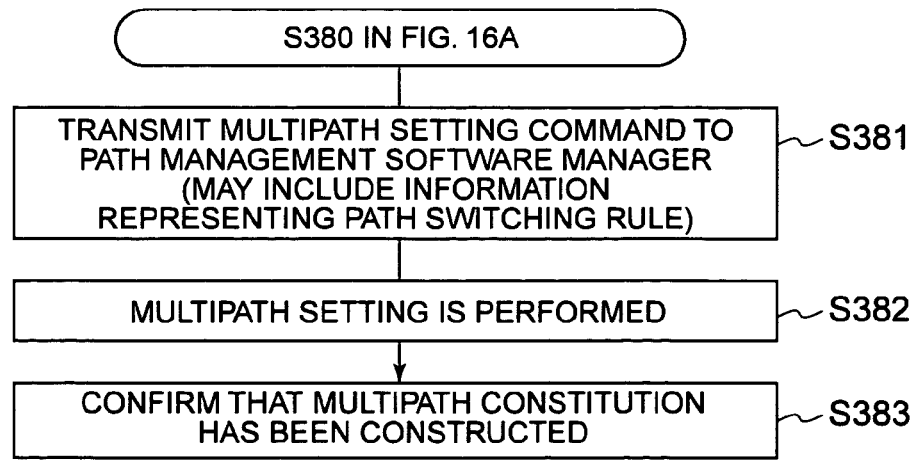
FIG. 17C shows a fifth part of an example of the flow of volume setting processing.

In the multipath setting (S380 in FIG. 16A), as shown in FIG. 17C, the host agent program 121 issues a multipath setting command to the path management software manager 115 (S381). As a result, the path management software manager 115 constructs a multipath environment (S382). The host agent program 121 is able to confirm whether a multipath environment has been constructed by issuing an inquiry to the path management software manager 115 (S383). Further, information expressing the path switching rules maybe included in the multipath setting command. A specific example of such information will be provided subsequently.

Figure 18A:
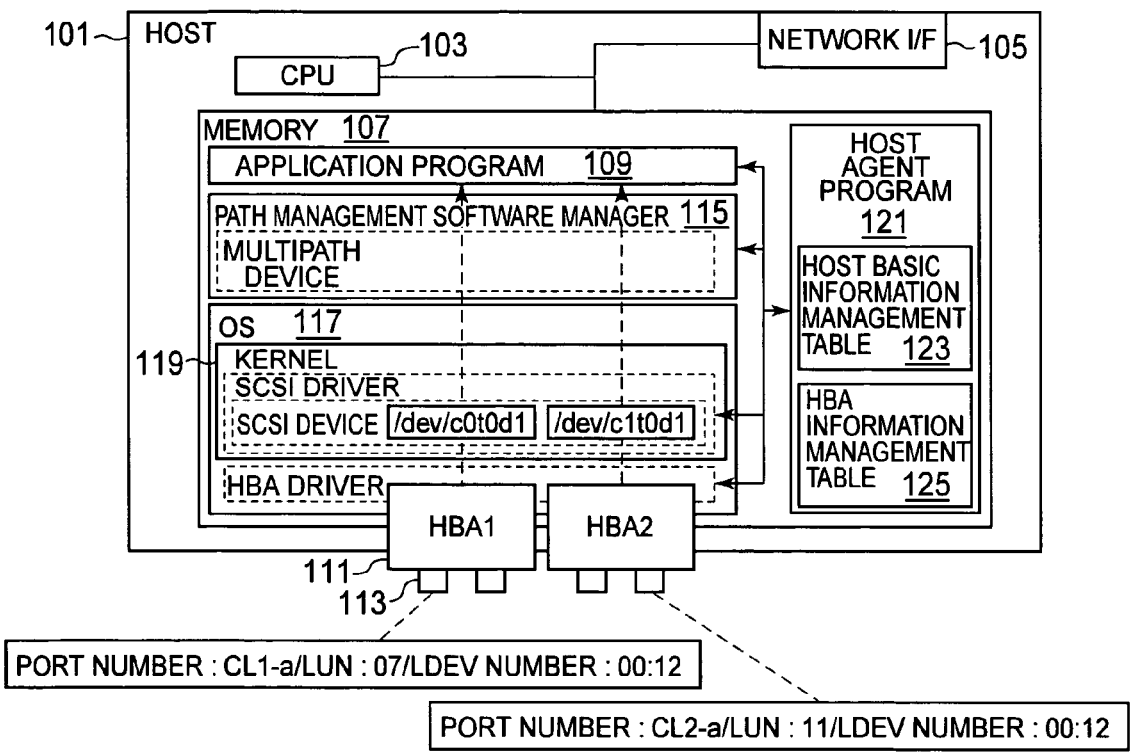
FIG. 18A shows the access environment prior to construction of the multipath environment.
Figure 18B:
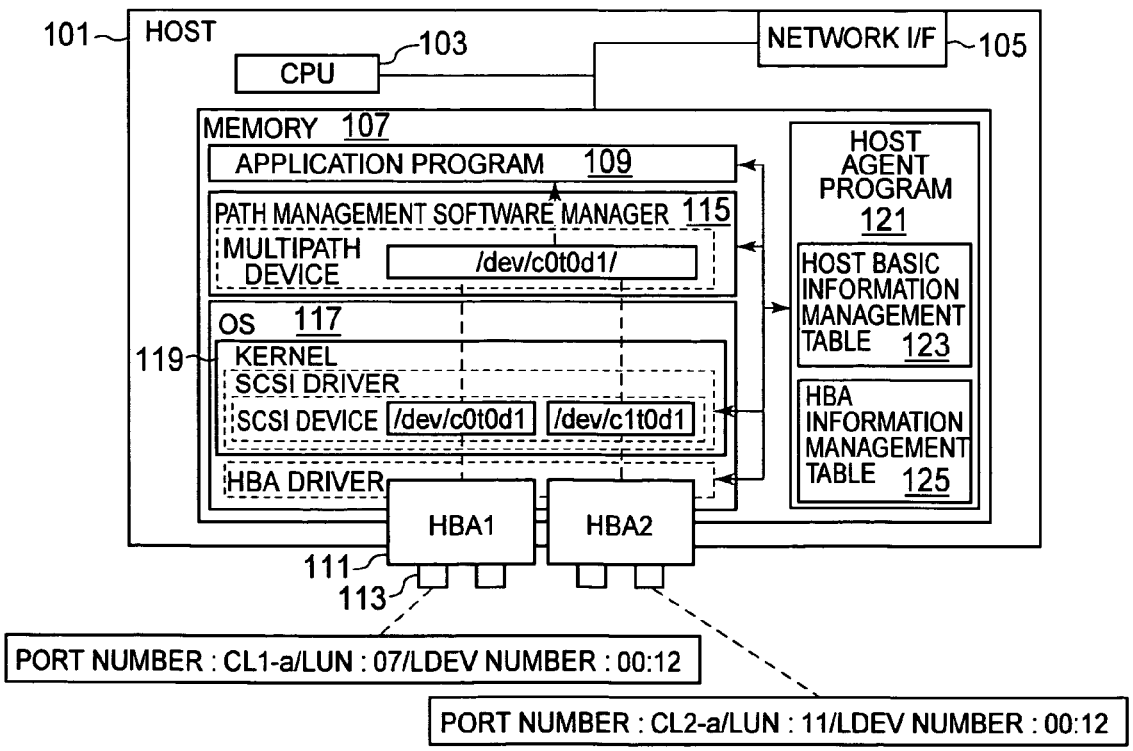
FIG. 18B shows the access environment following construction of the multipath environment.

FIG. 18A shows the access environment prior to the construction of the multipath environment and FIG. 18B shows the access environment following the construction of the multipath environment.

In S372 in FIG. 17B, for example, the OS117 receives, from two host ports, volume information (including the port number, LUN and LDEV number, for example) with respect to the LDEV for which the LDEV number is 00:12 (referred to as the 'target LDEV' in the description of FIGS. 18A and 18B hereinbelow). Hence, two instances are generated for 'SCSI device'. At this stage, as shown in FIG. 18A, the target LDEV is seen as two devices by the application 109 and it is not known that the destination of the two devices is the same target LDEV.

As a result of S381 in FIG. 17C, the path management software manager 115 receives a multipath setting command. In this case, the path management software manager 115 specifies that the LDEV numbers in the two volume information items (managed by the OS117, for example) which are received for the target LDEV are the same and constructs the multipath environment for the target LDEV. More specifically, the path management software manager 115 creates and associates one multipath device (instance) with two 'SCSI device' instances. The multipath device is supplied to the application program 109. As a result, two devices for 'SCSI device' are not seen by the application program 109 and, because the multipath device is seen, same is seen as one device. In other words, in this embodiment, a 'multipath environment' signifies a situation where a multipath is associated with multipath devices constructed so that a computer program of a higher order than the path management software manager 115 (an application program in this example) is not aware of the fact that there are a plurality of paths connected to the same LDEV. The multipath environment is a portion of an access environment.

Further, as mentioned earlier, information representing path switching rules may be contained in the multipath setting command that is transmitted from the host agent program 121 to the path management software manager 115. A path switching rule is a rule related to switching to establish which of a plurality of paths (multipath) connected to the same LDEV is used (the path management software manager 115 is able to manage the respective paths constituting the multipath by using a path ID (a number, for example), for example. Specific examples of a path switching rule include "using another path after using a path continuously P times (where P is an integer of one or more)", "using another path for which the load of the path being used (the number of times an access request is issued per unit of time, for example) exceeds a predetermined value", and so forth. The path management software manager 115 is able to set the information when the information representing a path switching rule is contained in the multipath setting command and perform path switching control that conforms to the path switching rule after a multipath environment is constructed.

According to the above embodiment, the host user constructs a multipath environment having a multipath via host ports of the required number of host ports by designating the LDEV capacity and the number of ports desired by the user. Hence, the host user is able to construct a multipath environment even when the information setting method for the path management software manager 115 and the name of the OS117 and so forth are not known.

Furthermore, according to this embodiment, even when the host user does not input host environment information such as the HBA-WWN and OS name and so forth, an LDEV to which access is controlled according to the host mode function and the LUN security function can be identified by the host.

Furthermore, according to the above embodiment, in cases where the HBA of the host is exchanged and where the host operating in the N+1 hot standby constitution is switched, host information collection processing, host information report processing, and volume setting processing are performed as a result of the host agent program 121 being started (or restarted). As a result, when the HBA of the host is exchanged or even when the host operating in the N+1 hot standby constitution is switched, the need for the host user or management user to reset the host environment information can be dispensed with.

Furthermore, according to the above embodiment, a virtual host is prepared and the LDEV is allocated beforehand to the virtual host (the LDEV is reserved for the virtual host). Further, when the host 101 which is not connected to the SAN 401 is newly connected to the SAN 401, for example, the virtual host is made a substantive host as a result of associating the host environment information related to the host 101 with the virtual host and an LDEV that satisfies the LDEV capacity required for setting is automatically allocated to (established for) the host 101 from one or more reserved LDEV.

Although an embodiment of the present invention was described hereinabove, this is an illustration for the purpose of describing the present invention and there is no intention to limit the scope of the present invention to this embodiment alone. The present invention can also be implemented in a variety of other forms.

For example, in the above embodiment, the communication between the host 101 and storage system 501 may be executed in accordance with the iSCSI protocol. In this case, for example, the host 101 may comprise a communication device that has a communication port to which an iSCSI name (a unique ID of the iSCSI protocol) is allocated. Further, in this case, for example, in the above embodiment, iSCSI names may be exchanged instead of WWN between the host 101 and the storage systems.

Figures 20A, 20B:
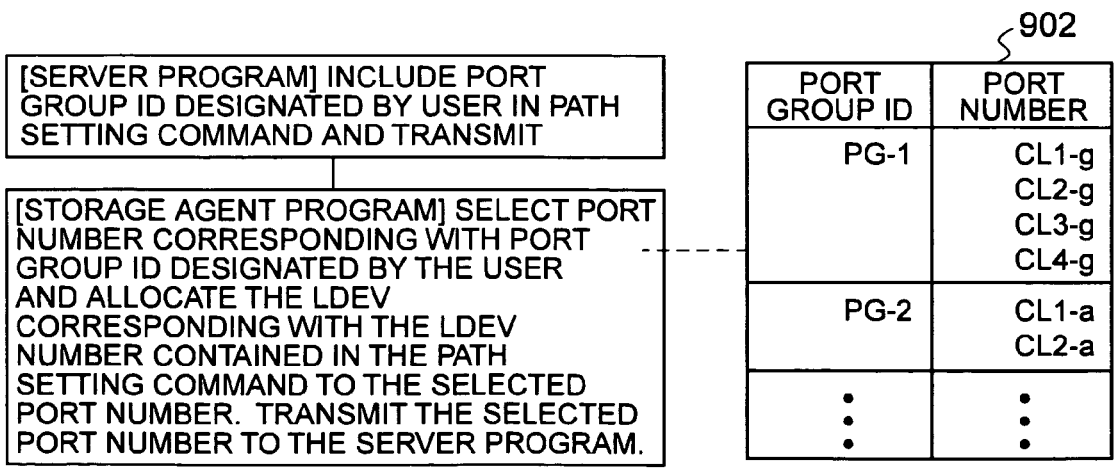
FIG. 20A shows an example of an input screen to which a host group ID is input instead of the required number of host ports input.
FIG. 20B is an explanatory diagram of the LDEV allocation to the respective host ports when the host group ID has been input.

Moreover, a port group ID may also be input instead of the required host port number, for example. More specifically, for example, the client program 209 may display the input screen that is exemplified in FIG. 20A instead of the input screen that is exemplified in FIG. 15A. In this case, the management user is able to input the desired port group ID. The server program 317 is able to transmit a path setting command that contains the port group ID to the storage agent program 529. The storage agent program 529 is able to specify a plurality of port numbers that correspond with the port group ID in the path setting command from the port management table 902 (a table that is stored in the memory 527 of the SVP 525, for example) and associate an LDEV number (an LDEV number that is specified in S352 of FIG. 16B, for example) with the specified plurality of port numbers. In other words, according to this example, because the management user designates a port group ID, ultimately, a multipath environment can be constructed by a plurality of paths that include a plurality of port numbers that belong to the port group ID.

Moreover, the server program 317 and client program 209 may be implemented by one computer program. Furthermore, at least one of the server program 317 and client program 209 may be provided in the host 101 and storage system 501. In other words, at least one function of the management server 301 and management client 201 may be provided in the host 101 and storage system 501.

What is claimed is:

1. An access environment construction system that can be implemented by a computer system that comprises a host and a storage system, the storage system comprising a plurality of communication ports, a plurality of logical volumes, and a storage controller section such that host environment information which is information related to a host environment can be allocated to at least either at least one of the plurality of communication ports or at least one of the plurality of logical volumes; when a certain communication port among the plurality of communication ports receives a request from the host, the controller section accepts the request if host environment information related to a transmission source host of the request is allocated to the certain communication port and/or the logical volume specified by the request but does not accept the request if no such allocation has been made, the access environment construction system comprising:

an access environment construction control section;

a host environment information acquisition section that acquires the host environment information from an environment management section that manages the host environment information of the host and reports the host environment information thus acquired to the access environment construction control section; and a storage setting section that constructs an internal path which is a logical path in the storage system by allocating any of the plurality of logical volumes to any of the plurality of communication ports of the storage system and allocates host environment information to at least one of the communication port and logical volume of the constructed path, the access environment construction control section:

receiving a designation of a volume condition which is a logical volume-related condition from a user, searching for a logical volume that matches the designated condition among the plurality of logical volumes, instructing the storage setting section to construct the internal path by allocating the logical volume thus found to any of the plurality of communication ports, and instructing the storage setting section to allocate host environment information from the host environment information acquisition section to at least one of the communication port and logical volume of the constructed internal path such that, if the host transmits a request for volume information which is logical volume-related information to the storage system and the host environment information of the host is adapted to the host environment information that is allocated to the communication port receiving the request and/or the logical volume of the internal path containing the communication port, volume information for the logical volume is received from the communication port, and the logical volume is identified.

2. The access environment construction system according to claim 1, wherein a path management section that can manage a plurality of paths to the identified logical volume as alternative paths is installed in the host and, the access environment construction control section receives a port designation related to the communication port from the user, and instructs the storage setting section to associate each of the logical volumes thus found with two or more communication ports specified by the port designation among the plurality of communication ports and, therefore, if the host transmits a volume information request to the storage system, the same logical volume is identified as two or more devices because volume information related to the same logical volume is received from each of the two or more communication ports; and as a result of a multipath setting command being issued to the path management section, the path management section is made to construct a multipath environment for identifying the two or more devices as one logical volume.

3. The access environment construction system according to claim 2, wherein
in the port designation, a port group is designated and two or more ports belonging to the designated port group are specified.

4. The access environment construction system according to claim 2, wherein
the multipath setting command contains information expressing a path switching rule related to switching of a plurality of paths with respect to the same logical volume and, as a result, the path management section can be made to perform path switching control that conforms to the path switching rule.

5. The access environment construction system according to claim 1, wherein
when the host environment information changes, the host environment information acquisition section re-acquires host environment information and transmits the re-acquired host environment information same to the access environment construction control section.

6. The access environment construction system according to claim 1, wherein
the volume condition is a logical volume capacity; and
the access environment construction control section prepares a logical volume that conforms to the volume condition by combining two or more logical volumes among the plurality of logical volumes when a logical volume that conforms to the volume condition is not found.

7. The access environment construction system according to claim 1, wherein
the access environment construction control section reserves a logical volume for a virtual host and seeks, from one or more logical volumes reserved for the host corresponding with the virtual host, a logical volume that conforms to the volume condition.

8. The access environment construction system according to claim 7, wherein
the access environment construction control section virtually prepares a host by receiving, from the user, an input of second information which is information of a different type from that of the host environment information.

9. The access environment construction system according to claim 7, wherein
when host environment information is received, the access environment construction control section associates the received host environment information with the second information.

10. The access environment construction system according to claim 1, wherein
the host environment information is at least one of OS (Operating System) information which is information related to the OS of the host and communication device information which is information related to the communication device that allows the host to communicate with the storage system.

11. The access environment construction system according to claim 10, wherein
the communication device information is a WWN (World Wide Name) or iSCSI (Internet Small Computer System Interface) name that corresponds with the port of a host bus adapter.

12. The access environment construction system according to claim 1, wherein
the storage setting section constitutes a host group which is a set of two or more LDEV (Logical Device) allocated to the same communication port.

13. The access environment construction system according to claim 12, wherein
as a result of the storage setting section setting OS (Operating System) information that is contained in the host environment information for the constituted host group, security that does not allow access to a logical volume belonging to the host group by a host that does not possess an OS that conforms to the OS information can be executed for the storage system.

14. The access environment construction system according to claim 1, wherein
the host environment management section is an Operating System (OS) of the host; and
the host environment information acquisition section is a host agent prepared to be capable of communicating with the OS of the host.

15. The access environment construction system according to claim 1, wherein
a path management section capable of managing a plurality of paths to the identified logical volume as alternative paths are installed in the host;
the access environment construction control section prepares a host virtually by receiving, from the user, an input of second information which is information of a different type from that of the host environment information and, upon receiving host environment information, makes the virtual host a substantive host by associating the received host environment information with the second information,
reserves a logical volume for the virtual host and searches for a logical volume that conforms to the volume condition from one or more logical volumes reserved for the substantive host corresponding with the virtual host,
receives a port designation related to the communication port from the user, and
instructs the storage setting section to associate each of the logical volumes thus found with two or more communication ports specified by the port designation among the plurality of communication ports and,
therefore, if the host transmits a volume information request to the storage system, the same logical volume is identified as two or more devices because volume information related to the same logical volume is received from each of the two or more communication ports; and
as a result of a multipath setting command being issued to the-path management section, the path management section is made to construct a multipath environment for identifying the two or more devices as one logical volume.

16. An access environment construction method of a computer system that comprises a host and a storage system, the storage system comprising a plurality of communication ports, a plurality of logical volumes, and a storage controller section such that host environment information which is information related to a host environment can be allocated to at least either at least one of the plurality of communication ports or at least one of the plurality of logical volumes; when a certain communication port among the plurality of communication ports receives a request from the host, the controller section accepts the request if host environment information related to a transmission source host of the request is allocated to the certain communication port and/or the logical volume specified by the request but does not accept the request if no such allocation has been made, the method comprising the steps of:

acquiring the host environment information from the environment management section that manages the host environment information of the host;

receiving a designation of a volume condition which is a logical volume-related condition from a user;

searching for a logical volume that matches the designated condition among the plurality of logical volumes;

constructing an internal path which is a logical path in the storage system by allocating the logical volume thus found to any of the plurality of communication ports of the storage system; and allocating the acquired host environment information to at least one of the communication port and logical volume of the constructed internal path, such that, if the host transmits a request for volume information which is logical volume-related information to the storage system and the host environment information of the host is adapted to the host environment information that is allocated to the communication port receiving the request and/or the logical volume of the internal path containing the communication port, volume information for the logical volume is received from the communication port, and the logical volume is identified.

\* \* \* \* \*